US009894158B2

(12) United States Patent
Ranasinghe et al.

(10) Patent No.: US 9,894,158 B2
(45) Date of Patent: Feb. 13, 2018

(54) METHOD AND APPARATUS FOR CONTROL OF MULTIPLE AUTONOMOUS MOBILE NODES BASED ON DYNAMIC SITUATIONAL AWARENESS DATA

(71) Applicant: EPISYS SCIENCE, INC., Poway, CA (US)

(72) Inventors: Nadeesha Oliver Ranasinghe, Torrance, CA (US); Bong Kyun Ryu, Poway, CA (US); Wei-Min Shen, Rancho Palos Verdes, CA (US)

(73) Assignee: EPISYS SCIENCE, INC., Poway, CA (US)

( * ) Notice: Subject to any disclaimer, the term of this patent is extended or adjusted under 35 U.S.C. 154(b) by 33 days.

(21) Appl. No.: 14/716,841

(22) Filed: May 19, 2015

(65) Prior Publication Data
US 2015/0334768 A1 Nov. 19, 2015

Related U.S. Application Data

(60) Provisional application No. 62/000,450, filed on May 19, 2014, provisional application No. 62/000,398, filed on May 19, 2014.

(51) Int. Cl.
*H04W 24/10* (2009.01)
*H04W 4/02* (2009.01)
(Continued)

(52) U.S. Cl.
CPC .......... *H04L 67/12* (2013.01); *G05D 1/104* (2013.01); *G06K 9/6284* (2013.01);
(Continued)

(58) Field of Classification Search
CPC ... H04W 76/045; H04W 24/10; H04W 4/021; H04W 72/0406; H04W 76/021;
(Continued)

(56) References Cited

U.S. PATENT DOCUMENTS 6,636,781 B1 10/2003 Shen et al.
2003/0164794 A1* 9/2003 Haynes ............... H04B 1/7172
342/353
(Continued)

FOREIGN PATENT DOCUMENTS

CN 102749847 A * 10/2012
CN 103592949 A * 2/2014

OTHER PUBLICATIONS

Intelsat, Satellite Basics, printed Oct. 28, 2015.*
(Continued)

*Primary Examiner* — Redhwan K Mawari
*Assistant Examiner* — Alan D Hutchinson
(74) *Attorney, Agent, or Firm* — Arent Fox LLP

(57) ABSTRACT

Techniques for autonomously establishing, maintaining, and repairing of a wireless communication network among multiple autonomous mobile nodes (AMN) are provided. The multiple AMNs are flown towards a first node. A tentacle is established with the first node and extended to cover a second node over a distance, thereby establishing a wireless communication network between the first node and the second node via the multiple AMNs. Any damage to the established wireless communication network or tentacle may be autonomously detected and repaired by using spare AMNs. Further, the communication network may be used to enable autonomous detection, tracking of the second node, as well as autonomous detection of a contamination area, based on data received from one or more sensors onboard the AMNs deployed in the air.

33 Claims, 20 Drawing Sheets

(51) Int. Cl.

| | |
|---|---|
| H04W 72/04 | (2009.01) |
| H04W 76/02 | (2009.01) |
| H04W 76/04 | (2009.01) |
| H04L 29/08 | (2006.01) |
| G07C 5/02 | (2006.01) |
| G07C 5/08 | (2006.01) |
| H04W 40/24 | (2009.01) |
| G05D 1/10 | (2006.01) |
| G06K 9/62 | (2006.01) |
| H04W 84/18 | (2009.01) |
| H04W 84/00 | (2009.01) |
| G05D 1/00 | (2006.01) |
| G06K 9/00 | (2006.01) |

(52) U.S. Cl.
CPC ............ *G06K 9/6296* (2013.01); *G07C 5/02* (2013.01); *G07C 5/08* (2013.01); *H04W 4/021* (2013.01); *H04W 4/023* (2013.01); *H04W 24/10* (2013.01); *H04W 40/248* (2013.01); *H04W 72/0406* (2013.01); *H04W 76/021* (2013.01); *H04W 76/045* (2013.01); *G05D 1/00* (2013.01); *G06K 9/00664* (2013.01); *G06K 9/6297* (2013.01); *H04W 84/005* (2013.01); *H04W 84/18* (2013.01)

(58) Field of Classification Search
CPC . H04W 84/005; H04W 84/18; H04W 40/248; H04W 4/023; H04L 67/12; G06K 9/6296; G06K 9/6284; G06K 9/00664; G06K 9/6297; G05D 1/104; G05D 1/00; G07C 5/02; G07C 5/08
See application file for complete search history.

(56) References Cited

U.S. PATENT DOCUMENTS

| | | |
|---|---|---|
| 2007/0288132 A1 | 12/2007 | Lam |
| 2007/0299947 A1 | 12/2007 | El-Damhougy |
| 2008/0228335 A1 | 9/2008 | Bodin et al. |
| 2013/0325357 A1 | 12/2013 | Walerow et al. |

OTHER PUBLICATIONS

Wikipedia article, Node (networking), printed Sep. 19, 2016.*
Ryan, Allison, et al. "A modular software infrastructure for distributed control of collaborating UAVs." AIAA Guidance, Navigation, and Control Conference and Exhibit. 2006.*
Machine Translation of CN 102749847, printed Apr. 5, 2017.*
Machine Translation of CN 103592949, printed Apr. 5, 2017.*
Ahmadzadeh, Al. et al. "Cooperative Control of UAVs for Search and Coverage". pp. 1-14, 2006.
Altshuler, Y. et al. "The Cooperative Hunters—Efficient Cooperative Search for Smart Targets Using UAV Swarms".Second International Conference on Informatics in Control, Automation and Robotics, 2005.
Bamberger, R.J. et al. "Autonomous Geolocation of RF Emitters Using Small, Unmanned Platforms". John Hopkins APL Technical Digest, vol. 32, No. 3, 2013, pp. 636-646.
Bamberger, R.J. et al. "Flight Demonstrations of Unmanned Aerial Vehicle Swarming Concepts". John Hopkins APL Technical Digest, vol. 27, No. 1, 2006, pp. 41-55.
Chiu, H.C.C. et al. "Tentacles: Self-Configuring Robotic Radio Networks in Unknown Environments". In Proc. 2009 IEEE/RSJ International Conference on Intelligent Robots and Systems, Oct. 2009.
Gu, D.L. et al. "UAV Aided Intelligent Routing for Ad-Hoc Wireless Network in Single-area Theater". IEEE Wireless Communications and Networking Conference, pp. 1220-1225, 2000.
Hauert, S. et al. "Ant-based swarming with positionless micro air vehicles for communication relay". Laboratory of Intelligent Systems, Swarm Intelligence pp. 1-15, 2008.
Jin, Y, et al. "Balancing Search and Target Response in Cooperative Unmanned Aerial Vehicle (UAV) Teams". IEEE Transactions on Systems, Man, and Cybernetics—Part B: Cybernetics, vol. 36, No. 3, Jun. 2006.
Maiviei, M. et al. "Co-Fields: Towards a Unifying Approach to the Engineering of Swarm Intelligent Systems". Engineering Societies in the Agents World III, pp. 1-13, 2003.
Payton, D. et al. "Compound behaviors in pheromone robotics". Robotics and Autonomous Systems, 44, pp. 229-240, Sep. 2003.
Quaritsch, M. et al. "Networked UAVs as aerial sensor network for disaster Management applications". Elektrotechnik & Informationstechnik, 2010, pp. 56-63.
Ranasinghe, N. et al. "Autonomous Surveillance Tolerant to Interference". 2012, pp. 73-83.
Rosati, S. et al. "Speed-Aware Routing for UAV Ad-Hoc Networks". IEEE Globecom 2013, 4th International IEEE Workshop on Wireless Networking & Control for Unmanned Autonomous Vehicles, 2013.
Scheidt, D. et al. "Cooperating Unmanned Vehicles". IEEE Networking, Sensing and Control Conference, 2005, pp. 326-331.
Scheidt, D.H. "Organic Persistent, Surveillance, and Reconnaissance". John Hopkins APL Technical Digest, vol. 31, No. 2, 2012, pp. 167-174.
Shen, W. et al. "Hormone-Inspired Adaptive Communication and Distributed Control for CONRO Self-Reconfigurable Robots". IEEE Trans. on Robotics and Automation, 18 (5), pp. 1-12, Oct. 2002.
Shen, W. et al. "Hormone-Inspired Self-Organization and Distributed Control of Robotic Swarms". Autonomous Robots, 17(1), pp. 93-105, Jul. 2004.
Shen, W. et al. "Simulating Self-Organization for Multi-Robot Systems". International Conference on Intelligent and Robotic Systems, 2002.
Zhan, P. et al. "Wireless Relay Communications using an Unmanned Aerial Vehicle". IEEE Transactions on Aerospace and Electronics Systems, pp. 2068-2085, Jul. 2011.
Cetin, O. et al. "Continuous Airborne Communication Relay Approach Using Unmanned Aerial Vehicles". Journal of Intelligent & Robotic Systems. Jan. 2012. [Retrieved on Jul. 27, 2015].
Goddemeier, N. et al. "Role Based Connectivity Mamagement with Realistic Air-toGround Channels for Cooperative UAVs". IEEE Journal on Selected Area in Communications, vol. 30, No. 5, Jun. 2012. [retrieved on Jul. 27, 2015]. pp. 951-963.
International Search Report dated Aug. 21, 2015; Application No. PCT/US2015/031629.
Morgenthaler, S. et . "UAVNet: A mobile wireless mesh network using Unmanned Aerial Vehicles". Globecom Workshops (GC Wkshops), IEEE. Dec. 2012. [Retrieved on Jul. 27, 2015].
Zagli, I. et al. "Obstacle Free Airborne Communication Relay Approach by Using Autonomous Unmanned Aerial Vehicles". Jun. 2012. [Retrieved on Jul. 27, 2015].

* cited by examiner

METHOD AND APPARATUS FOR CONTROL OF MULTIPLE AUTONOMOUS MOBILE NODES BASED ON DYNAMIC SITUATIONAL AWARENESS DATA

CLAIM OF PRIORITY UNDER 35 U.S.C. §119

This application for Patent claims priority to U.S. Provisional Application No. 62/000,450, titled "Method and Apparatus for Pilotless Flying Control of Multiple Autonomous Mobile Vehicles Based on Dynamic Situational Awareness Data," filed on May 19, 2014; and U.S. Provisional Application No. 62/000,398, titled "Method and Apparatus for Biologically Inspired Autonomous Infrastructure Monitoring," filed on May 19, 2014, the entire content of both of which are incorporated by reference herein.

GOVERNMENT LICENSE RIGHTS

This invention was made with government support under FA8750-12-C-0231 awarded by the Air Force Research Laboratory. The government has certain rights in the invention.

BACKGROUND

Aspects of the present disclosure relate generally to wireless communication, and more particularly, to device embedded with techniques for establishing and maintaining wireless communications between two or more nodes via a plurality of autonomous mobile (AMN) nodes.

Unmanned mobile vehicles are often useful in various military and civilian applications. Maintaining constant and reliable communication between mobile entities, distributed across a large geographical area is a crucial task for many commercial and military applications. For example, when teams of people are deployed in hostile or sensor deprived environments in the absence of fixed communication infrastructure, maintaining radio contact with a base station would drastically increase the efficiency of coordinating the deployment, yet maintaining communications should not interfere with the primary tasks of these entities.

Conventionally, most autonomous mobile nodes, including unmanned aerial vehicles (UAVs), are operated remotely by human operators with the ratio of one or more operators per node. As such, forming a mobile communication network with multiple remotely controlled UAVs can be prohibitively costly and very inefficient because the required number of human operators may grow very quickly. Further, the operators need to control the deployed UAVs, while coordinating with others to monitor the performance of the deployed communications network. A feasible solution must address several issues such as a limited range of wireless communications, coordinating the motion of multiple mobile nodes in a distributed manner without direct human control via wireless communication, utilizing heterogeneous nodes efficiently and securely, dealing with unplanned damage seamlessly and safely, enabling an operator to monitor and override any node in the network in case of observed malfunctions, etc. Further, with existing technologies, the controlling and monitoring of multiple autonomous mobile nodes is sub-optimal and inefficient (often done manually by the operators), and further there is no effective mechanism to deal with airborne, autonomous mobile node failures once deployed in the air.

Thus, there is a need for systems and techniques for enhanced, efficient controlling and monitoring of multiple autonomous mobile nodes, and effective mechanism to deal with failures of the autonomous mobile nodes deployed in the air.

SUMMARY

The following presents a simplified summary of one or more aspects in order to provide a basic understanding of the present disclosure. This summary is not meant to be an extensive overview of all contemplated aspects, and is thus intended to neither identify key or critical elements of all aspects nor delineate the scope of any or all aspects. Its sole purpose is to present some concepts of one or more aspects in a simplified form as a prelude to the more detailed description that is presented later.

The present technology described herein addresses one or more problems with the existing technologies, by enabling multiple autonomous mobile nodes (AMNs) or apparatuses, such as unmanned aerial vehicles (UAVs), to autonomously control themselves based on network performance and other onboard sensor data measurements in real time. Further, the present technology provides solutions to one or more issues of existing technologies, such as a limited range of wireless communications, coordinating the motion of AMNs in a distributed manner and preventing the formation of a sub-optimal network, dealing with AMN failures, repair and reinforcement of critical locations of the communication network. For example, to overcome the limited range of wireless communications, the present technology disclosed herein provides a highly mobile ad-hoc network in which the AMNs route their data traffic (e.g. communication data, sensor data, command and response data, etc.) through their neighboring AMNs or stationary nodes if they are part of the same wireless network.

In an aspect, the present disclosure may use signal strength information of wireless communication signals received by its onboard communication radio to determine its mobile (e.g. flying) behavior, thereby allowing the autonomous mobile node to control its wireless connections/disconnections and minimize the effects of environmental factors on the wireless network. In another aspect, motions of autonomous mobile nodes equipped with the present technology are controlled in a distributed manner, preventing a formation of suboptimal networks but enabling the continuous improvement towards an optimal network. Further, in another aspect, the present disclosure may convert received wireless signal information, such as signal quality, from adjacent autonomous mobile nodes into field information including fields each having attractive and repulsive properties, based on certain thresholds. Using the strength and direction information of these fields in connection with virtual fields from certain types of nodes that are out of a range, such as destination nodes on the ground, the present technology can control each autonomous mobile node autonomously and accomplish mission objectives (e.g., rapid communication backbone deployment, object detection and tracking, geo-location, etc.) in a distributed manner.

Further, in an aspect, the present disclosure enables flying heterogeneous mobile nodes from one point to another in a safe manner. Since most of the heterogeneous mobile nodes, such as UAVs, have some limited autopilot capabilities based on global positioning system (GPS) guidance, the present technology described herein can be used in conjunction with the autopilot capabilities such that data relating to proximity sensors and/or signal strength from neighboring autonomous mobile nodes is used to ensure both safety and success of a given mission. In another aspect, any spare autonomous mobile nodes can be used to proactively reinforce critical locations of the wireless communications network to minimize repair time in the event of failure. Also, in accordance with certain aspects, the effectiveness of the present technology described herein may be maximized by dynamically tuning radio signal transmission/reception parameters during runtime based on collected information about environmental and traffic conditions. Further, in accordance with certain aspects of the present disclosure, one or more operators are enabled to monitor multiple autonomous mobile nodes through a unified interface. The control data relating to the multiple autonomous mobile nodes can be relayed back, via the formed ad-hoc network, to a central location for the one or more operators who can interact with and control the multiple autonomous mobile nodes, when necessary.

In an aspect, the present disclosure provides a method for collaborative communication by autonomously establishing and maintaining a wireless communication network between two or more designated mobile or stationary nodes at a distance that prevents them from having direct communications. In particular, an autonomous mobile apparatus flies towards the first designated node until a reliable wireless communication link with the first designated node is established. The first designated node may include a first node on the ground. Then, the autonomous mobile apparatus is autonomously navigated to an edge of its communication range towards the next designated node, based at least in part on data received from one or more autonomous mobile nodes deployed to form a wireless communication network. Repeating this process may result in the growth of a wireless communication network (or a tentacle) which, when completed, connects two designated nodes.

Further, in an aspect, it is determined whether there is a tentacle associated between two designated nodes. When it is determined that there is a tentacle associated, any autonomous mobile apparatus that is not already in the tentacle, will navigate along the tentacle and extend it.

In another aspect, a portion of the wireless communication network may be determined to be damaged, and in such a case the damaged wireless communication network may be autonomously repaired. Further, the portion of the wireless communication network may be determined to be damaged based on a determination of whether one of the one or more autonomous mobile nodes that are deployed is out of communications. Also, the autonomous repair of the wireless communication network may be done by replacing the one of the one or more autonomous mobile nodes that is out of communications with another autonomous mobile node coupled to the wireless communication network.

In an aspect, the data may include information on roles of the one or more autonomous mobile nodes in the wireless communication network, signal strength, or quality of signals received from the one or more autonomous mobile nodes.

In an aspect, establishing a plurality of wireless communication links may include navigating the one or more autonomous mobile nodes, based on fields determined from the received data from the one or more autonomous mobile nodes. Each field may be configured to include a field strength component and a velocity component and to result in attraction or repulsion of the one or more autonomous mobile nodes toward each other.

In another aspect of the present disclosure, a method for collaborative sensing by seamlessly converting measurements from potentially heterogeneous sensors (e.g., chemical, biological, optical, magnetic, etc.) into a field strength is provided, which can influence the motion of networked one or more autonomous mobile nodes. This forms a distributed sensor network with capabilities to autonomously reinforce critical locations, detect damage to the formed network and self-repair. An autonomous mobile apparatus is autonomously flown toward a first node on the ground. Wireless communications are established with the first node on the ground. The autonomous mobile apparatus then autonomously navigate to a location toward a second node on the ground based at least in part on data received from the first node or received from one or more autonomous mobile nodes deployed in the air to form a wireless communication network.

In an aspect, whether there is a tentacle associated with the first node may be determined, in which the tentacle includes one or more wireless communication links established by the one or more autonomous mobile nodes. When it is determined that there is a tentacle associated with the first node, the autonomous mobile apparatus may navigate along the tentacle toward the location based at least in part on the data received from the one or more autonomous mobile nodes. Alternatively, when it is determined that there is no tentacle associated with the first node, the autonomous mobile apparatus may navigate toward the location based at least in part on the received data from the first node. Further, the data may include field information based on received signals from the one or more autonomous mobile nodes, and the field information may include fields. Each field may be configured to include a field strength component and a velocity component and to result in attraction or repulsion of the autonomous mobile apparatus. Also, the data may include information on at least one of: roles of the one or more autonomous mobile nodes, signal strength, or quality of signals received from the one or more autonomous mobile nodes.

Further, whether a wireless communication link with a second node on the ground has been established may be determined, and upon determining that the wireless communication link with the second node has been established, the wireless communication network between the first node and the second node may be established via the autonomous mobile apparatus and the one or more autonomous mobile nodes deployed in the air.

In an aspect, whether the wireless communication network has been damaged may be determined. A probe signal may be sent to a first adjacent autonomous mobile node in the tentacle. In response to the probe signal, a response signal may be received from the first adjacent autonomous mobile node within a period of time set by a timer. Alternatively, in response to the probe signal and upon expiration of the timer, the first adjacent autonomous mobile node may be determined to be out of communications and the wireless communication network may be determined to be damaged.

In another aspect, after determining that the wireless communication network has been damaged, communications may be performed with a second adjacent autonomous mobile node to replace the first adjacent autonomous mobile node with another autonomous mobile node associated with the tentacle, and the wireless communication network may be re-established between the first node and the second node via the another autonomous mobile node.

In another aspect, the at least one processor is further configured to process the received data from the one or more sensors, detect presence of a second node on the ground based on the processed data, and transform the received data into the field information. The one or more sensors may be configured to include at least one image sensor.

In another aspect, the at least one processor is further configured to, upon detecting the presence of the second node on the ground, dynamically track movement of the second node on the ground.

In another aspect, the at least one processor is further configured to represent the second node on the ground as a virtual node in determining the attractive and/or repulsive force, and navigate the autonomous mobile apparatus based on the field information.

In another aspect, the at least one processor is further configured to capture a video on the movement of the second node on the ground, and transmit the captured video to the first node via the tentacle.

In another aspect, the at least one processor is further configured to process the received data from the one or more sensors, determine whether a second nod is present on the ground based on the received data, and upon determining that the second node is present on the ground, communicate to attract one or more autonomous mobile apparatuses to a location close to the second node on the ground. The one or more sensors may be configured to include at least one radio frequency (RF) geo-location sensor and the received data may include detection probability of RF signal emitted by the second node on the ground. Further, the at least one processor is further configured to transmit to the first node a determined location of the second node on the ground via the tentacle.

In another aspect, the at least one processor is further configured to process the received data from the one or more sensors, determine whether a detected level of a target contaminant material is greater than or equal to a predetermined value. The at least one processor is further configured to, upon determining that the detected level of the target contaminant material is greater than or equal to the predetermined value, communicate information on the detected level of the target contaminant material to the first node via the tentacle. The one or more sensors may be configured to include at least one biological or chemical sensor, and the received data may include the detected level of the target contaminant material. The at least one processor is further configured to determine a location of the detected target contaminant material, based on information received from the one or more autonomous mobile apparatuses which detected the target contaminant material.

In another aspect of the present disclosure, a method for collaborative navigation by autonomously adapting to changes in designated nodes may be provided. In this aspect, the designated nodes may be represented by virtual locations or non-cooperative nodes. Varying the virtual locations for each node over time may facilitate the formation of different network shapes and systematic navigation across a terrain.

Still another aspect of the present disclosure provides an autonomous mobile apparatus including at least one processor and a memory coupled to the at least one processor. The autonomous mobile apparatus is configured to execute various functions or aspects of the present disclosure described herein. The at least one processor may be configured to navigate the autonomous mobile apparatus toward a first node on the ground, and receive data from one or more sensors onboard the autonomous mobile apparatus. The at least one processor may be further configured to convert the received data into field information, and the field information may include fields each configured to include an attractive force or a repulsive force. Further, the at least one processor may be further configured to, based on the field information, navigate the autonomous mobile apparatus.

The one or more sensors may include at least one of: a radio geo-location sensor, an image sensor, a chemical sensor, or a biological sensor.

In an aspect, the at least one processor may be configured to determine whether there is a tentacle established with the first node, the tentacle being configured to include one or more wireless communication links established by one or more autonomous mobile apparatuses. Further, the at least one processor may be configured to, when it is determined that there is a tentacle established with the first node, navigate the autonomous mobile apparatus along the tentacle toward a location based on the field information, or alternatively, when it is determined that there is no tentacle established with the first node, establish the tentacle with the first node.

In another aspect, the at least one processor may be configured to determine whether a second node on the ground is within a wireless communications range of the autonomous mobile apparatus, and upon determining that the second node on the ground is within the wireless communications range of the autonomous mobile apparatus, establish a wireless communications link with the second node on the ground, thereby establishing a wireless communication network between the first node and the second node on the ground.

In another aspect, a non-transitory computer readable medium storing computer executable code for performing various functions or aspects of the present disclosure is provided. The non-transitory computer readable medium includes code or instructions for causing one or more processors to make decisions every few seconds or sooner for the purpose of autonomously flying a mobile apparatus to form a wireless communication network, and perform various functions or aspects of the present disclosure as described earlier.

These and other aspects of the present technology will become more fully understood upon a review of the detailed description, which follows below.

BRIEF DESCRIPTION OF THE DRAWINGS

The drawing figures depict one or more implementations in accordance with the present teachings, by way of example only, not by way of limitation. In the figures, like reference numerals refer to the same or similar elements.

DETAILED DESCRIPTION

Figure 1:
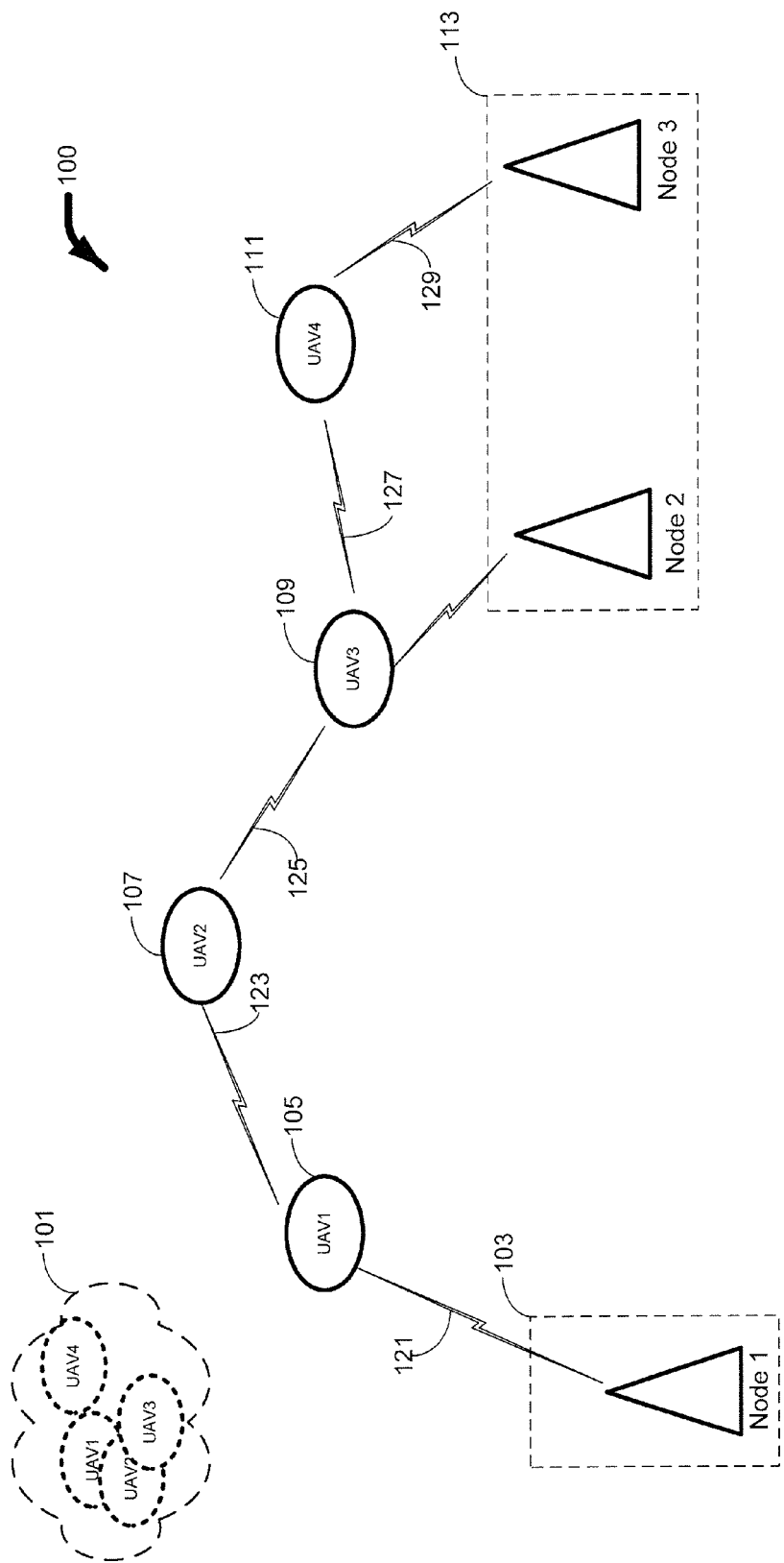
FIG. 1 is a conceptual diagram illustrating a wireless communications network in accordance with certain aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The present disclosure disclosed herein may also be known as "Biologically inspired Artificially Intelligent Reconfiguration" ("BioAIR") system and techniques ("Bio-AIR Methodology"), which are developed to coordinate airborne communication nodes such as unmanned aerial vehicles (UAV) in order to autonomously form and maintain dynamic communication networks. This system and techniques draw upon inspirations from biological cell differentiation through hormone based communication to coordinate a swarm of airborne nodes, such as autonomous mobile nodes in a distributed manner by mapping the radio (sensor) signals into digital hormones.

The present disclosure offers at least three primary capabilities in a single system: collaborative communication, sensing, and navigation. For collaborative communication, the present disclosure is able to autonomously create a mobile ad-hoc network connecting several designated nodes by strategically positioning other nodes based on the desired communication signal quality between them. This capability enables new applications such as rapidly deployable Internet and/or communication service in access denied environments. For collaborative sensing, the present disclosure is able to autonomously reinforce critical locations based on network traffic, detect any damage to the formed network, and self-repair. Additionally, the present disclosure can coordinate the sensing effort of heterogeneous sensors distributed amongst all nodes in the network to form a wide range of formations in response to the real-time sensor data and mission objectives. This capability may be needed for applications such as communication in anti-access environments, remote sensing, geo-location, aerial surveying, and border patrol, among others. For collaborative navigation, the present disclosure is able to follow the motion of designated nodes while maintaining the formed communication network, provided that the nodes can react fast enough. This capability may be needed for applications such as target tracking, agricultural product care, mobile escorting and perimeter defense.

As such, the present disclosure disclosed herein provides enhanced capabilities as well as functionalities over any existing technologies, such as collaborative communication, sensing, and navigation simultaneously as a single system for autonomous mobile nodes. Further, the present technology described herein provides a human operator with the ability to monitor the performance and dynamically adjust behaviors of the autonomous mobile nodes in real time.

Figure 10A:
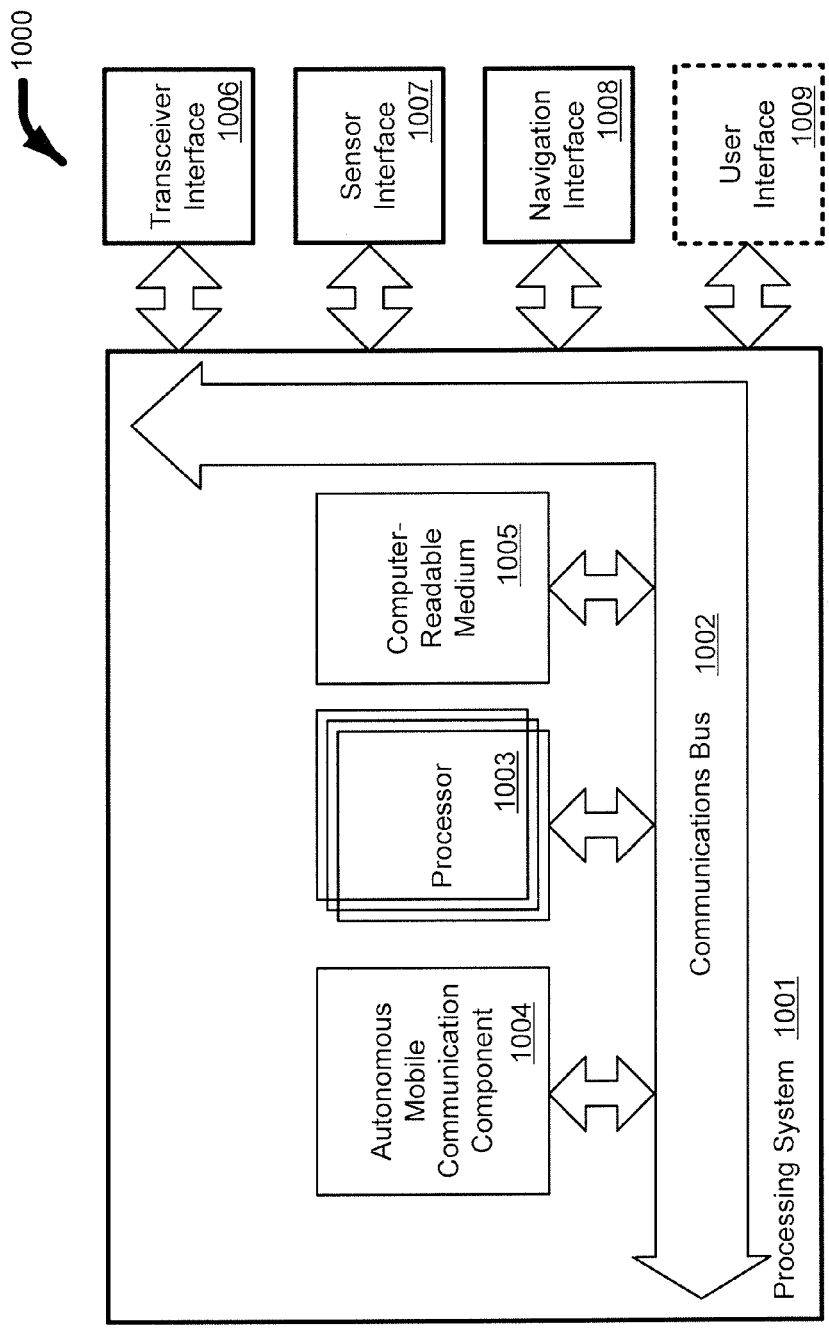
FIGS. 10A, 10B, and 10C are functional block diagrams and an example of a graphical user interface conceptually illustrating an apparatus in accordance with certain aspects of the present disclosure.

FIG. 1 is a conceptual diagram illustrating a communications network in accordance with certain aspects of the present disclosure. In an aspect, the present disclosure provides a distributed solution which coordinates efforts of one or more autonomous mobile nodes, such as various types of unmanned aerial vehicles, to achieve a robust wireless communication network between designated sites. In essence, the present technology described herein enables collaborative communication among the one or more autonomous mobile nodes. As illustrated in FIG. 1, a communication network 100 includes one or more origin nodes 103 (e.g., Node 1), one or more autonomous mobile nodes 105, 107, 109, and 111 (e.g., UAV1, UAV2, UAV3, and UAV4) and one or more destination nodes 113 (e.g., Node 2, Node 3). In the example, the origin nodes 103 or destination nodes 113 may be mobile nodes or stationary nodes. Further, the one or more mobile nodes may include one or more unmanned aerial vehicles (UAVs) such as UAV1, UAV2, UAV3, UAV4, etc. Also, the one or more mobile nodes may include a component, such as an artificial intelligence program (which is not shown) such as, including but not limited to, an autonomous airborne communication component for establishing and maintaining wireless communications networks. That is, as described herein, each unmanned airborne node (interchangeably used herein as "autonomous mobile node" or "autonomous mobile apparatus") may include one or more processing systems on board, such as the processing system 1001 (as shown in FIG. 10A) including an autonomous mobile communication component 1004 for implementing various aspects of the present technology disclosed herein.

In another aspect, each autonomous mobile node may have unique identification (ID) and/or Internet Protocol (IP) address assigned. The unique IDs and/or IP addresses may be assigned before deployment for a mission. In addition, or alternatively, the unique ID or IP address for each autonomous mobile node can be dynamically assigned to the autonomous mobile node over a wireless communications link by a node on the ground (e.g., Node 1) once the autonomous mobile node is deployed in the air and comes in contact with the node on the ground.

Alternatively, a plurality of autonomous mobile nodes may be deployed on the ground as well as in the air, and a designated autonomous mobile node may take a role of a server in a server-client network environment and dynamically assign the unique IDs and/or IP addresses to the deployed plurality of autonomous mobile nodes on the ground as well as in the air. In another aspect, each of the autonomous mobile nodes may communicate with other autonomous mobile nodes deployed in the air to determine a size of a wireless communication network for performing the mission.

As shown in the example in FIG. 1, a communication network 100 may be established between two nodes—an origin node (or site) 103, such as Node 1, and a destination node (or site) 113, such as Node 2 and/or Node 3, by forming a chain of communication links which comprises one or more wireless communication links 121, 123, 125, 127, and 129. In other words, in the example, a communication tentacle (or a tentacle) may be formed between the origin node 103 and the destination node 113. In the present disclosure, the word "tentacle" is used herein to mean a chain of communication links, or a chain of autonomous mobile nodes establishing a communication link among the autonomous mobile nodes, or a chain of multiple wireless communication links established by one or more autonomous mobile nodes. Thus, a tentacle as used herein may include one or more wireless communication links originating from a first node on the ground, e.g., Node 1. Further, a complete communication tentacle between the origin node 103 and the destination node 113 may refer to a chain of nodes including, for example, Node 1, UAV1, UAV2, UAV3, UAV4, Node 2 and/or Node 3, as shown in FIG. 1.

As noted above, in FIG. 1, Node 1, Node 2, and Node 3 may be ground stations or mobile nodes. In other words, Node 1, Node 2, and Node 3 can be either stationary nodes or moving nodes. Further, Node 1 may be a radio signal transmission and/or reception device or station. Also, Node 2 or Node 3 may be a radio signal transmission and/or reception device or station. Alternatively, in an aspect of the present disclosure, Node 1, Node 2 or Node 3 may include a destination, such as a group of people, devices, vehicles, etc.

In an aspect, the autonomous mobile nodes 105, 107, 109, and 111 may be launched or deployed from one or more nearby locations towards the origin node 103, such as Node 1. Also, the autonomous mobile nodes may be launched from anywhere at varying time intervals with some a priori knowledge about the origin node 103 and the destination node 113, such as geographical location information of the origin node 103 and the destination node 113. Alternatively, when multiple origin nodes are available, an operator of the communication network 100 may choose which one to assign for each autonomous mobile node prior to launch. Also, the autonomous mobile nodes 105, 107, 109, and 111 can be launched in any order. Further, in an aspect, the origin node 103 may be a traffic site (e.g., an area with a radio transmitter which can communicate with one or more autonomous mobile nodes) from which a tentacle can originate. The destination node 113 may also be a traffic site (e.g., an area with a radio transmitter which can communicate with one or more autonomous mobile nodes) which the tentacle can grow to reach such that a wireless communication network between the origin node 103 and the destination node 113 can be established.

In an aspect, the autonomous mobile nodes 105, 107, 109, and 111 can be programmed with certain data, such as a mission profile, before being deployed in the air. A typical mission profile may include location information of the origin node 103 and/or destination node 113, radio capabilities of the autonomous mobile nodes 105, 107, 109, and 111, and certain information on priority traffic nodes that need preferential treatment in various situations. The location information of the origin 103 or destination nodes 113 may include information on Global Positioning System (GPS) coordinates of the origin node 103 and the destination node 113. In addition or alternatively, the location information of the origin node 103 and the destination node 113 may be wirelessly transmitted to the autonomous mobile nodes 105, 107, 109, and 111 from a deployment site. The radio capabilities of the autonomous mobile nodes 105, 107, 109, and 111 may include wireless communication protocols, communication ranges, a number of wireless communication channels, a type of antenna (e.g., omni-directional vs. multi-directional antenna), etc.

In the example described herein, each autonomous mobile node makes a decision to move (or navigate) to a new location in the air or hold its position based on its internal role in the communication network 100 (e.g., Free, Orphan, Tip, Backbone, Extra, etc.), roles of adjacent autonomous mobile nodes in the communication network 100 (e.g., Free, Orphan, Tip, Backbone, Extra, etc.), signal strength, or quality of signals, such as radio frequency signals, received from its adjacent autonomous mobile nodes, or real-time data collected from onboard sensors of the autonomous mobile node. Further, each autonomous mobile node may take on a different role in the communication network 100 during or after a formation of a tentacle between the origin node 103 and the destination node 113. An example of role transitions of an autonomous mobile node is described below in reference to FIG. 3.

Referring back to FIG. 1, a group 101 of autonomous mobile nodes, such as UAV 1, UAV 2, UAV 3, and UAV 4 are deployed in the air from a location towards the origin node 103. For example, assume that the UAV 1 is first deployed among the group of autonomous mobile nodes. The UAV 1 autonomously moves and first comes in contact with the origin node 103, such as Node 1, and searches for a tentacle associated with the origin node 103. If there is no tentacle detected, then the UAV 1 creates a tentacle between the UAV 1 and Node 1, e.g., establishes a wireless communication link 121 (a tentacle) between the UAV 1 and Node 1. Once the UAV 2, UAV 3, and UAV 4 are deployed in the air, in accordance with certain aspects of the present disclosure, the UAV 2, UAV 3, and UAV 4 may autonomously fly towards Node 1 or Node 2. Each of the UAV 2, UAV 3, UAV 4 searches and detects the tentacle associated with the origin node 103, and operates to grow or extend the tentacle towards the destination node 113, such as Node 2 or Node 3.

In the example implementation, each autonomous mobile node has a predefined wireless communication range (e.g., a short range, mid-range, or long range) and autonomously navigates to establish a wireless communication link with an origin node or another autonomous mobile node deployed and detected to be within its wireless communication range or connectivity range. Thus, the one or more autonomous mobile nodes may be used to grow the tentacle to cover a large distance from the origin node 103 to the destination node 113. For example, if the origin node 103 and the destination node 113 are close in proximity to each other, then one autonomous mobile node deployed in the air may be needed to establish a wireless communication network between the origin node 103 and the destination node 113. Otherwise, the two or more autonomous mobile nodes deployed in the air may be needed to form and grow the tentacle to cover a long distance apart between the origin node 103 and the destination node 113.

Further, after the communication network 100 (or the final tentacle) between the origin node 103 and the destination node 113 has been completed, any extra autonomous mobile node (not shown) may autonomously position itself to enhance the completed final tentacle 100 or grow a new tentacle to a new destination node.

Figure 2:
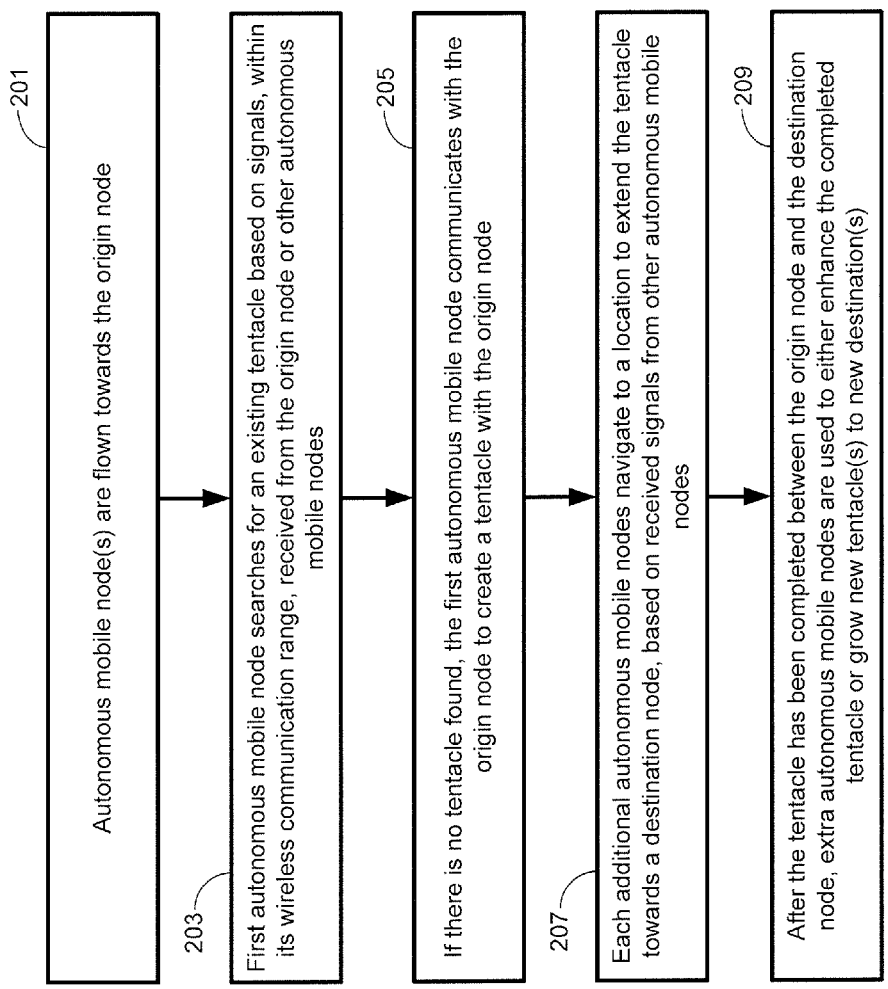
FIG. 2 is an example of a flowchart for autonomously establishing a wireless communication network in accordance with certain aspects of the present disclosure.

FIG. 2 illustrates an example flowchart for establishing a wireless communication network or a tentacle originating from an origin node. Initially, at 201, a group of autonomous mobile nodes (e.g., a group of autonomous mobile nodes 101 in FIG. 1) are deployed in the air, with each autonomous mobile node programmed with certain location information (e.g., GPS coordinates), such as those of the origin node and/or the destination node.

At 203, a first autonomous mobile node may detect the origin node, when the first autonomous mobile node comes in contact with the origin node within its wireless communications range. Upon the detection of the origin node, the first autonomous mobile node may search for one or more existing tentacles associated with the origin node. The detection of the one or more existing tentacles may be done by communicating with the origin node or based on signals transmitted from the origin node or from other autonomous mobile nodes. In one implementation, the signals may be broadcast messages from the origin node or other autonomous mobile nodes. Each broadcast message may contain location information (e.g., GPS coordinates) of a broadcasting node, its role in a formation of a communication network or tentacle (e.g., Origin, Orphan, Free, Tip, Extra, Backbone, etc.). If the broadcasting node is part of a tentacle, the broadcast message may include information on the tentacle, such as a tentacle identifier and a state of the tentacle. As such, when the broadcast message does not include any information on the tentacle identifier and/or the state of the tentacle, then a receiving node may determine whether a tentacle is currently being created.

At 205, if no tentacle has been found or detected, the first autonomous mobile node becomes the first node to form an initial tentacle with the origin node. The first autonomous mobile node communicates with the origin node to create the initial tentacle with the origin node.

At 207, after the initial tentacle has been created (e.g., a wireless communication link has been established between the origin node and the first autonomous mobile node), each of remaining autonomous mobile nodes in the group autonomously navigate to a location towards a destination node, extending the initial tentacle towards the destination node by each adding an additional wireless communication link to the extended tentacle at an edge of a wireless communication range of its adjacent autonomous mobile node, which is an end of the previously extended tentacle.

In one implementation, a particular autonomous mobile node may move along the extended tentacle towards a location determined for the particular autonomous mobile node, based on information (e.g., signal quality) received from other autonomous mobile nodes in the group. When the particular autonomous mobile node arrives at the location, the particular autonomous mobile node may extend the previously extended tentacle by establishing and adding a wireless communication link between the particular autonomous mobile node and another autonomous mobile node which is a tip of the previously extended tentacle. The particular autonomous mobile node then becomes a new tip of the newly extended tentacle. In this way, with a sufficient number of autonomous mobile nodes used, the tentacle originating from the origin node can autonomously grow to reach the destination node over a distance (e.g., the tip of the tentacle and the destination node are within a wireless communication range of each other) by iteratively adding an additional communication link to a tip of the previously extended tentacle, as shown in FIG. 1.

Further, in another aspect, when there are multiple origin nodes and multiple destination nodes, one or more wireless communication networks (or tentacles) can be created from the multiple origin nodes to the multiple destination nodes through collaboration of autonomous mobile nodes as described above.

At 209, after the tentacle has been completed between the origin node and the destination node, any extra autonomous mobile nodes deployed in the air, which are not used to form the tentacle may be used to either enhance the completed tentacle or grow new tentacle(s) to new destination(s).

As noted above, a tentacle may be initially formed by an autonomous mobile node that first comes in wireless contact with the origin node, and thereafter the tentacle may grow in a manner similar to a biological growth by means of using additional autonomous mobile nodes deployed in the air. During the process of forming and growing the tentacle, each autonomous mobile node can take different roles or modes, as illustrated in FIG. 3.

Figure 3:
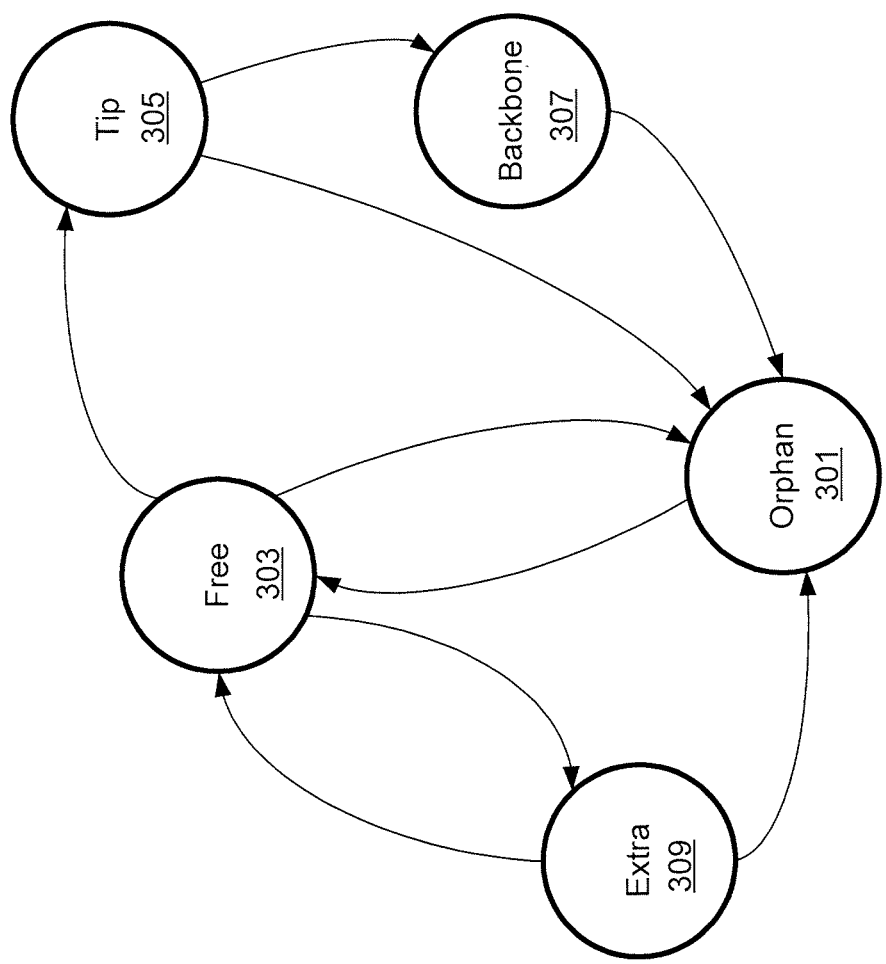
FIG. 3 is an example of a diagram illustrating transitions of different roles of a node in accordance with certain aspects of the present disclosure.

FIG. 3 illustrates an example diagram of role transitions illustrating different roles which each autonomous mobile node can assume in accordance with certain aspects of the present disclosure. As shown in FIG. 3, each autonomous mobile node may take one of the following roles or modes: "Orphan" 301 (e.g., an Orphan node), "Free" 303 (e.g., a Free node), "Tip" 305 (a Tip node), "Backbone" 307 (a Backbone node), or "Extra" 309 (an Extra node).

An Orphan node is a node that is outside of a communication range of any other autonomous mobile nodes. That is, the Orphan node may be disconnected from a tentacle or an origin node. A Free node is a node that can communicate with a tentacle or one or more autonomous mobile nodes forming the tentacle, but is not a part of the tentacle. A Free node is attracted by a destination node (e.g., attracted by a virtual destination field exerted by the destination node) and its anchor or Tip node, but it is repelled by all other nodes. A Tip node is a node that is currently at the tip of a tentacle and has wireless connectivity with an adjacent node located towards the origin node. A Backbone node is a node participating in forming a tentacle (or a wireless communication network between the origin node and the destination node), but not the Tip node. The Backbone node has wireless connectivity with either two Backbone nodes (e.g., UAV 2 in FIG. 1), with a Backbone node and the origin node (e.g., UAV 1 in FIG. 1), or with a Backbone node and the destination node (e.g., UAV 4 in FIG. 1), within its wireless communications range. Also, between two adjacent nodes (or sometimes referred to as tentacle nodes) there may be a parent-child relation, which is ordered from the origin node towards the destination node. That is, a node close to the origin node becomes a parent of another node (e.g., a child) in a tentacle formation. In the example, a Backbone node is attracted by its parent and child node, but it is repelled by all other nodes. An Extra node is a node that has reached the destination node, but is not required to extend the tentacle or form a part of the wireless communication network between the origin node and the destination node. The Extra node is free to move around or patrol around the tentacle formed between the origin node and the destination node.

As illustrated in FIG. 3, an autonomous mobile node may go through various role transitions during a formation of a tentacle. By way of example, initially, a new tentacle is created when an origin node changes its role to become a Tip node. One or more autonomous mobile nodes flown towards the origin node to form the tentacle are initially Orphan nodes. That is, in the example, at an initial deployment stage, all of the autonomous mobile nodes are disconnected from a tentacle or the origin node, and thus they are the Orphan nodes (e.g., in Orphan 301). An Orphan node may autonomously navigate towards the origin node, based on the location information of the origin node. Here, the location information, (e.g., GPS coordinates) of the origin node and/or of the destination node may be pre-programmed in memory of the Orphan node. Alternatively, the location information of the origin node may be wirelessly transmitted to the Orphan node while being deployed in the air.

When the Orphan node detects in its wireless communication range the origin node or a tentacle originating from the origin node but is not a part of the tentacle yet, the Orphan node becomes a Free node (e.g., in Free 303). By way of example, when the Free node detects a tentacle or a Tip node, which is a node at the end of the tentacle, the Free node establishes an anchor relation to the Tip node. The Free node is configured to move freely or along the tentacle to an equilibrium location based on a field from the Tip node and the destination node (which is described in detail below). At the equilibrium location, the Free node becomes a new Tip of the tentacle, thereby extending the tentacle by adding an additional wireless communication link (or range) of the autonomous mobile node. That is, if the autonomous mobile node detects one or more tentacles originating from the origin node, which are established by other autonomous mobile nodes, then the autonomous mobile node navigates along the tentacle and becomes a new Tip node at the end of the tentacle, extending the tentacle towards the destination node.

When the new Tip node establishes wireless connectivity with the previous Tip node, the previous Tip node becomes a Backbone node (e.g., in Backbone 307) of the tentacle and maintains wireless communications with an adjacent Backbone node and the new Tip node.

In this way, as an additional autonomous mobile node (e.g., a Free node) becomes a new Tip node one after another, the tentacle can be extended and eventually be extended from the origin node to reach the destination node because the tentacle is designed to extend in the direction of the destination node. Also, when the newly added node at the end of the tentacle becomes a Tip node and its adjacent node becomes a Backbone node, the newly added node becomes a child of the adjacent node in the tentacle formed and the adjacent node becomes a parent of the newly added node.

By repeating the process described above in an iterative manner, a wireless communication network originating from the origin node can be extended to reach the destination node, via using a number of autonomous mobile nodes. As noted above, the tentacle is thus "complete" between the origin node and the destination node only when the wireless communication network is established between the origin node and the destination node by means of one or more autonomous mobile nodes forming the tentacle.

In an aspect of the present disclosure, after completing the tentacle with the destination node, the last autonomous mobile node added to the tentacle may send a message to its nearest neighboring autonomous mobile node to inform that the tentacle has now been completed and/or a wireless communication network between the origin node and the destination node has been established. The nearest neighboring autonomous mobile node receives and forwards the message to its other nearest neighboring autonomous mobile node in the tentacle. The message is then propagated throughout the tentacle and reaches the origin node after multiple relays or forwarding of the message via intermediate nodes ("a one-hop broadcast to nearest neighbor scheme").

Further, in the completed tentacle, all communication messages and data transfers from any node in the tentacle including the origin node and/or the destination node are performed using the one-hop broadcast to nearest neighbors scheme, e.g., by relaying or forwarding data from a sending node to its nearest neighboring node in the tentacle either towards the origin node or the destination node.

In an aspect of the present disclosure, after the tentacle is completed between the origin node and the destination node, there can be some autonomous mobile nodes (e.g., Free nodes) which did not participate in forming the tentacle between the origin node and the destination node. Such Free nodes, which are deployed but are not needed to form the tentacle, become Extra nodes (e.g., in Extra 309). In another aspect, the Extra nodes may be used to reinforce the existing tentacle or build new tentacles, if desired. Alternatively, the Extra nodes may (i) stay around the destination node, (ii) fly back to the origin node along the completed tentacle, (iii) distribute along the completed tentacle to enhance the completed tentacle, or (iv) start to build a new tentacle for a new destination.

Alternatively, the Extra nodes may patrol back and forth along the completed tentacle between the origin node and the destination node to aid quick repair when damage to the wireless communication network is detected. In another aspect according to the present disclosure, the Extra nodes may spread around the destination node to improve threat tolerance at or near the destination node. In another aspect, the Extra nodes may spread around the origin node to improve surveillance at the origin node. Still in another aspect, in a case of multiple origin nodes, a unique identification may be assigned to each completed tentacle between an origin node and a destination node.

Figure 4:
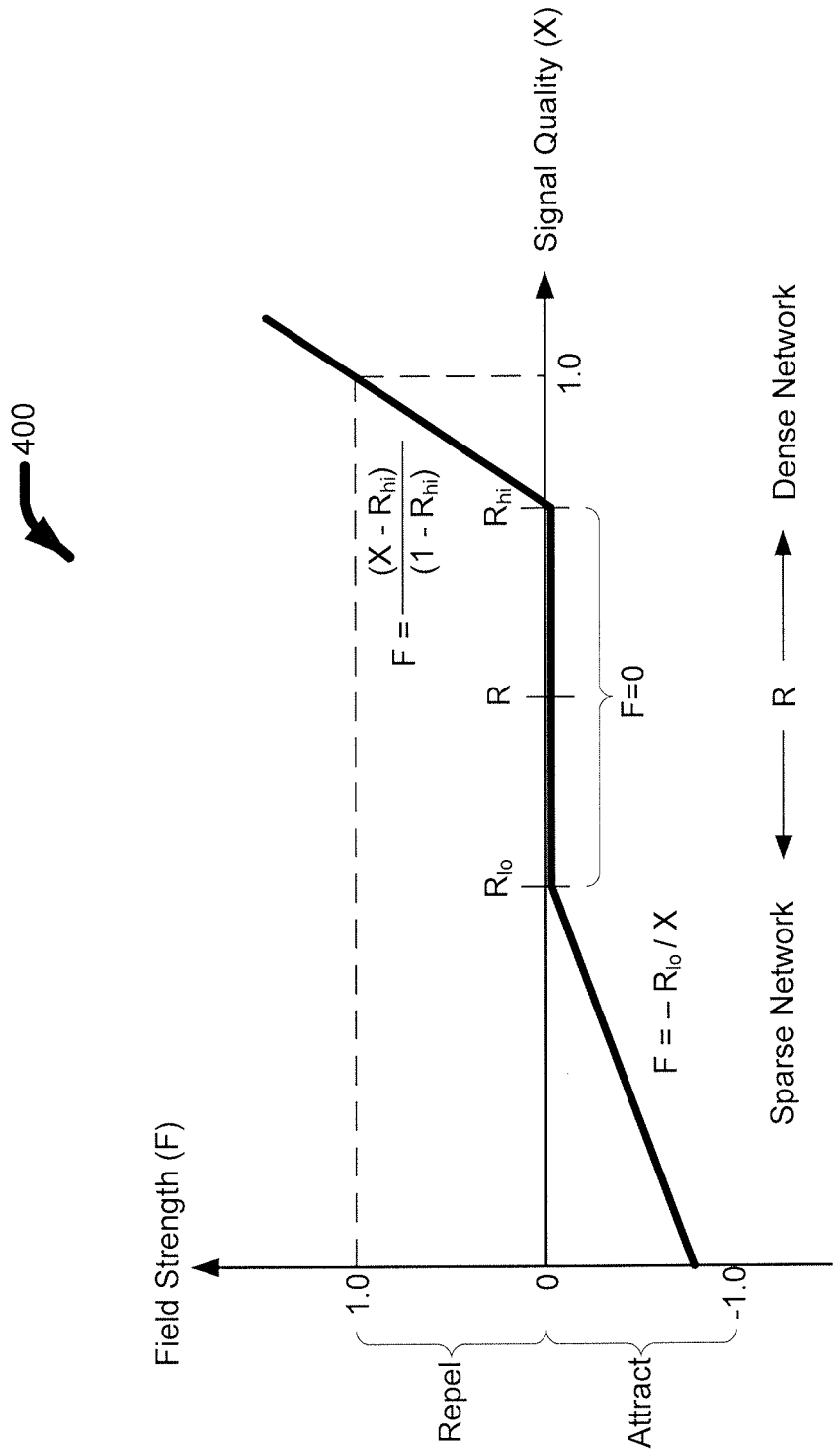
FIG. 4 is an example of a profile of field experienced by a node in accordance with certain aspects of the present disclosure.

FIG. 4 provides a conceptual diagram in accordance with certain aspects of the present disclosure. In the example, navigating an autonomous mobile node along one or more tentacles or wireless communication links is based on a profile of fields experienced by each autonomous mobile node. In an aspect of the present disclosure, the autonomous mobile node may hold its position at an edge of its communications range to a neighboring autonomous mobile node based on information on signals (e.g., signal strength, quality of signals, etc.) received from the neighboring autonomous mobile node. In one implementation, the signal strength or quality of signals may be converted into a vector with components, such as field strength and direction components, which correspond to the autonomous mobile node being attracted or repelled by the nearest neighboring autonomous mobile node. In an aspect, the quality of received signals may be determined based on a signal level or signal strength of a received radio frequency transmission. Signal strength is often measured and expressed in signal power (dBm or dBmW) received by an antenna of a deployed device, such as the autonomous mobile node; that is, in decibels (dB) above a reference level of one milliwatt (mW).

As shown in FIG. 4, a graph of signal quality (X) vs. field strength (F) is illustrated. Received signal quality (X) is converted into field strength (F) to determine whether attraction or repulsion is to be acted upon an autonomous mobile node. The graph shown in FIG. 4 illustrates such an example scheme, in which when the autonomous mobile nodes are spatially close to each other, they repel to prevent collisions, i.e., $X>R_{hi}$, where X represents received signal quality and $R_{hi}$ represents an upper limit of a reference signal quality value R. The graph further shows that when the autonomous mobile nodes are outside an acceptable range, they attract each other, i.e., $X<R_{lo}$, where X represents received signal quality and $R_{lo}$ represents a lower limit of the reference signal quality value R. Further, when the autonomous mobile nodes are completely out of a communication range, there is no signal or field.

Figure 5:
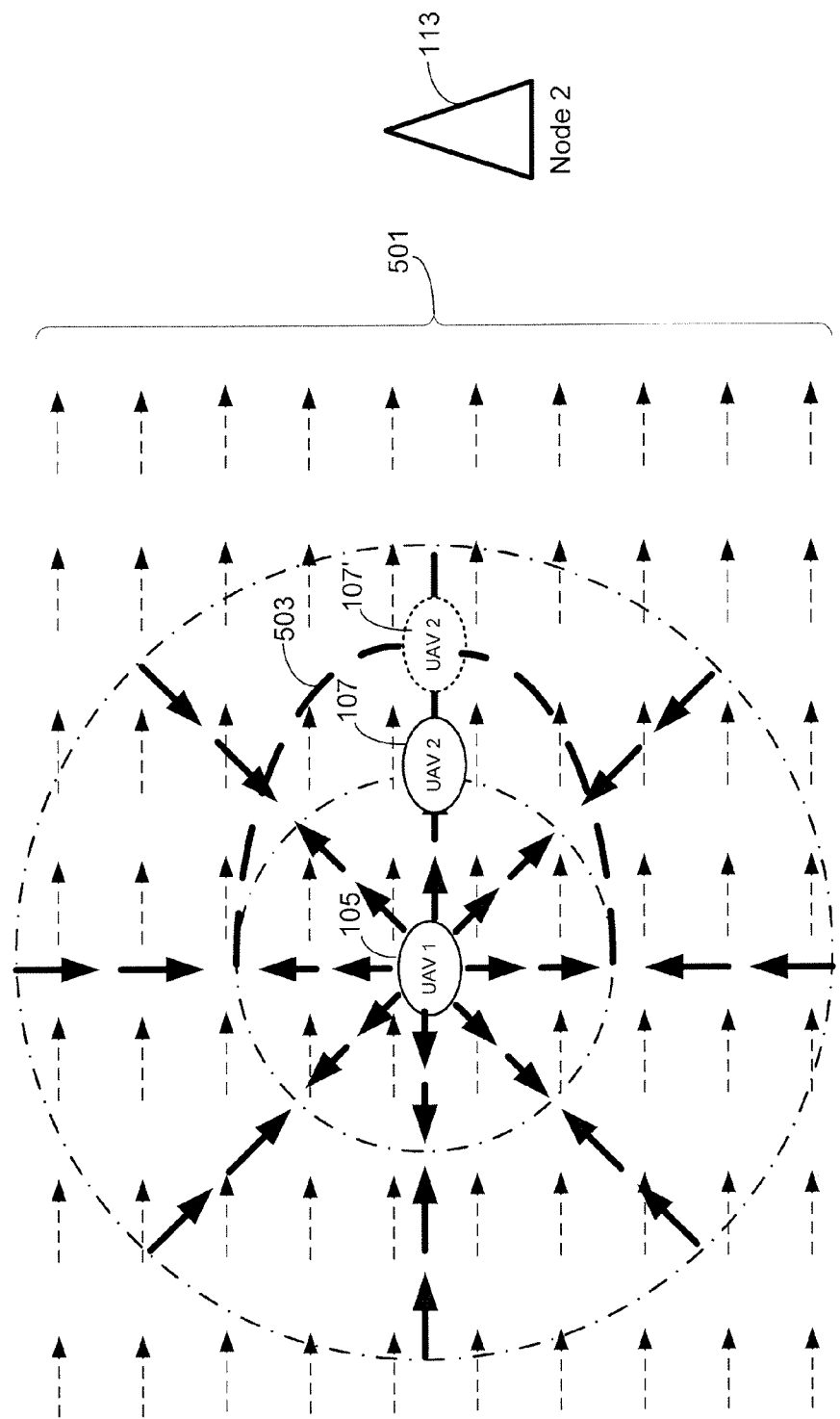
FIG. 5 is a conceptual diagram illustrating fields guiding a node towards a (designated) destination node in accordance with certain aspects of the present disclosure.

It is also noted that at the beginning of an initial deployment of autonomous mobile nodes, each autonomous mobile node may be provided with the location information of a destination node, such as Node 2 shown in FIG. 5, so as to compute a virtual attraction field 501 (see FIG. 5) towards a destination node 113, such as Node 2, even when the autonomous mobile node is outside of the communication range. Further, for illustration purposes, FIG. 5 shown only one destination node, such as Node 2, but there can be multiple destination nodes, such as Node 2 and Node 3, as shown in FIG. 1. In such a case of multiple destination nodes including Node 2 and Node 3, each autonomous mobile node may be provided with location information of the multiple destination nodes including Node 2 and Node 3, and a first virtual attraction field towards Node 2 may be computed first and then a second virtual attraction field towards Node 3 may be computed.

In an aspect of the present disclosure, the field strength of the received signal quality of a radio frequency transmission may be calculated using the following expression (A):

If $(X>R_{hi})$, Field_Strength=$(X-R_{hi})/(1-R_{hi})$

Else If $(X<R_{lo})$, Field_Strength=$-R_{lo}/X$

Else Field_Strength=0.

Also, velocity components (e.g., velocityX and velocityY) of field strength can be computed using the following expression (B):

velocityX=velocityX+Field_Strength*$(x_{self}-x_{other})$/sqrt$((x_{self}-x_{other})^2+(y_{self}-y_{other})^2)$, and velocityY=velocityY+Field_Strength*$(y_{self}-y_{other})$/sqrt$((x_{self}-x_{other})^2+(y_{self}-y_{other})^2)$, FIG. 5 illustrates a visualized diagram of example fields interacting between two adjacent autonomous mobile nodes 105 and 107 (e.g., UAV 1 and UAV 2) and a virtual attraction field 501 exerted by a destination node 113, such as Node 2. In one implementation, this virtual attraction field has a fixed magnitude of 1.0, and points in the direction of the destination node 113. Further, the virtual attraction field may be replaced by a field of the destination node 113 when the autonomous mobile node 107 is within a communication range with the destination node 113. In the example, based on the above expressions (A) and (B), the fields acting on the autonomous mobile node 107 are computed. The computed fields are summed together, resulting in an elliptical trajectory 503 for the autonomous mobile node 107. The elliptical trajectory 503 guides the autonomous mobile node 107 to an equilibrium point (e.g., the autonomous mobile node 107' at the equilibrium point) that exists closer to the destination node 113. In this way, the autonomous mobile node 107 autonomously navigates itself based on the fields (which may be based on received signal strengths) towards the destination node 113 within a wireless communication range of the autonomous mobile node 105 (e.g., while maintaining wireless communications with the autonomous mobile node 105).

Figure 6:
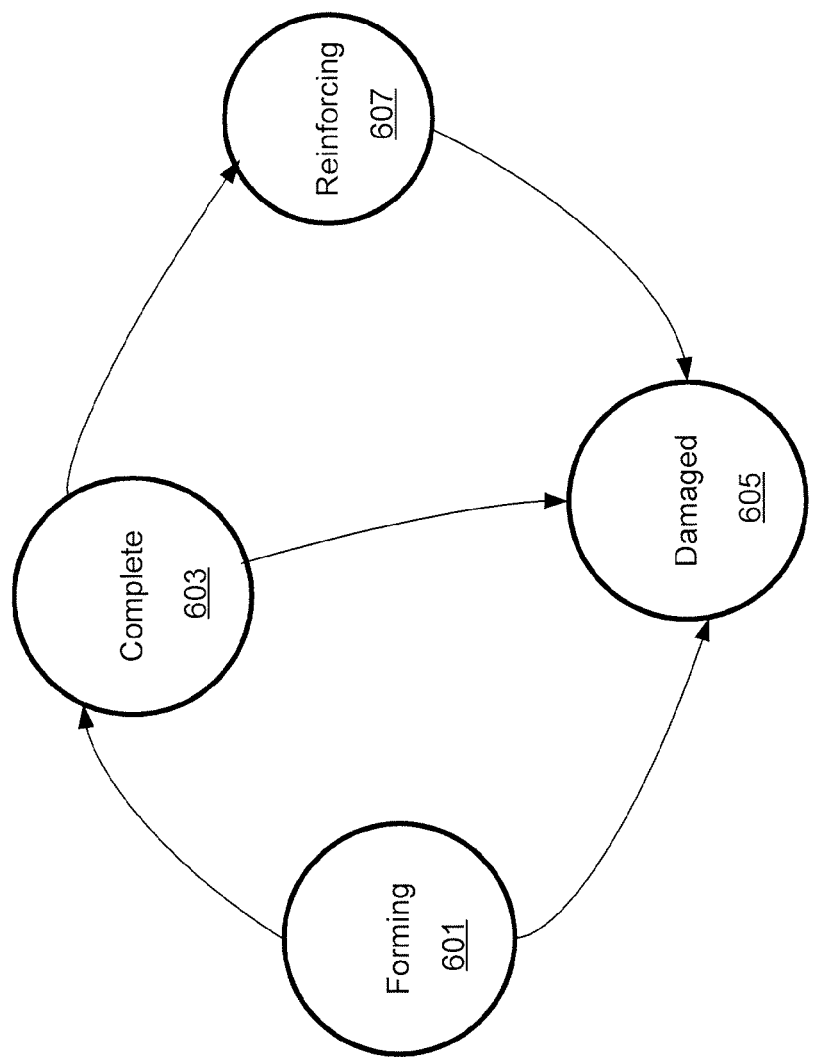
FIG. 6 is an example of a diagram illustrating state transitions for a wireless communication network in accordance with certain aspects of the present disclosure.

Further, a tentacle may have its own state transitions. For example, FIG. 6 illustrates an example diagram for state transitions for a tentacle in accordance with certain aspects of the present disclosure. That is, the tentacle originating from the origin node can be in different states depending upon its progress towards establishing wireless connectivity between the origin node and the destination node. In an aspect, the tentacle can be in one of the following states: Forming 601, Complete 603, Damaged 605, and Reinforcing 607.

In Forming 601 state of the tentacle, a new tentacle (or an initial wireless communication network) starts from an origin node or a destination node that has already been reached. Initially, there may not be any Tip node, but as soon as a first autonomous mobile node reaches its equilibrium point in its field, the first autonomous mobile node will become a Tip node. Also, the first autonomous mobile node may generate a unique identifier (ID) for the tentacle or the wireless communication network. For example, in one implementation, the unique identifier for the tentacle (the "tentacle ID") may be generated by merging a timestamp with the unique ID of the first autonomous mobile node. This allows a node to create or recreate a unique tentacle ID at different points in time. Use of unique tentacle IDs may facilitate construction of multiple tentacles, from a single origin node or to a single destination node without interfering with each other. Alternatively, with the unique tentacle IDs, multiple tentacles may be formed from a single origin node to multiple destination nodes, or from multiple origin nodes to a single destination node. When in contact with an incomplete tentacle, a node obtains its identifier (e.g., the tentacle ID) such that only signals from nodes containing the same tentacle ID may contribute to calculating the fields, thus removing interference from other tentacles.

Further, in the Forming 601 state of the tentacle (or a wireless communication network), the tentacle may include some Free nodes, Backbone nodes, and one Tip node. When the wireless communication network via one or more tentacles is established between the origin node and the destination node (e.g., the tentacle grows to reach the destination node), the tentacle or wireless communication network is in Complete 603 of the tentacle. Furthermore, when a Free node reaches within wireless communication ranges of a Tip node in the tentacle and the destination node, the Free node may complete the tentacle (or the wireless communication network), thereby establishing the wireless connectivity via the one or more autonomous mobile nodes between the origin node and the destination node over a distance. When the tentacle is complete (e.g., in Complete 603), all autonomous mobile nodes forming the tentacle will change their roles to become Backbone nodes, and no Tip node will exist in the tentacle or the network.

As soon as the tentacle has been completed from the origin node to the destination node, if no new destination nodes exist, then, as noted earlier, remaining Free nodes may become Extra nodes and anchor to the Backbone nodes of the tentacle for reinforcement purposes (e.g., in Reinforcing 607). In one implementation, each Backbone node may anchor one Extra node such that the one Extra node may receive signals from two or more neighboring Backbone nodes. This strategy ensures that a second tentacle may be formed given a sufficient number of mobile nodes at a safe distance away from the first tentacle, which means that if any damage occurs to the wireless communication network or the tentacle, the wireless communication network will reroute its traffic with minimal interruption.

In accordance with certain aspects of the present disclosure, a Free node may be adjacent to two Backbone nodes, a Tip node and a Backbone node, or a Backbone node and the origin or destination node. If any Backbone node is determined to not meet these criteria, then the tentacle or the wireless communication network is deemed to be damaged (e.g., in Damaged 605). When the damage is detected by a node, the node changes its role to become a Tip node (from a Backbone node), and any anchored Extra nodes are released to perform the needed repair (e.g., replacing the damaged Backbone node in the tentacle or the wireless communication network).

In one implementation, when multiple origin nodes are available, an operator may choose which origin node to assign to each autonomous mobile node prior to its launch. In another implementation, the multiple origin nodes can be assigned dynamically based on a number of Extra nodes and damage detected in the wireless communication network. In the presence of multiple destinations, a tentacle to the first destination can be completed, and then another tentacle can be built from that first destination to the next, and so on. When two partially completed tentacles meet, a Free node will encounter two Tips and the methodology disclosed herein may merge these two tentacles into one. This process helps to repair damage at multiple locations simultaneously by forcing reinforcement nodes to arrive from the origin node and/or the destination node.

In accordance with certain aspects of the present disclosure, each autonomous mobile node in the tentacle can autonomously detect damage to the tentacle and initiate a repair process.

Figure 7A:
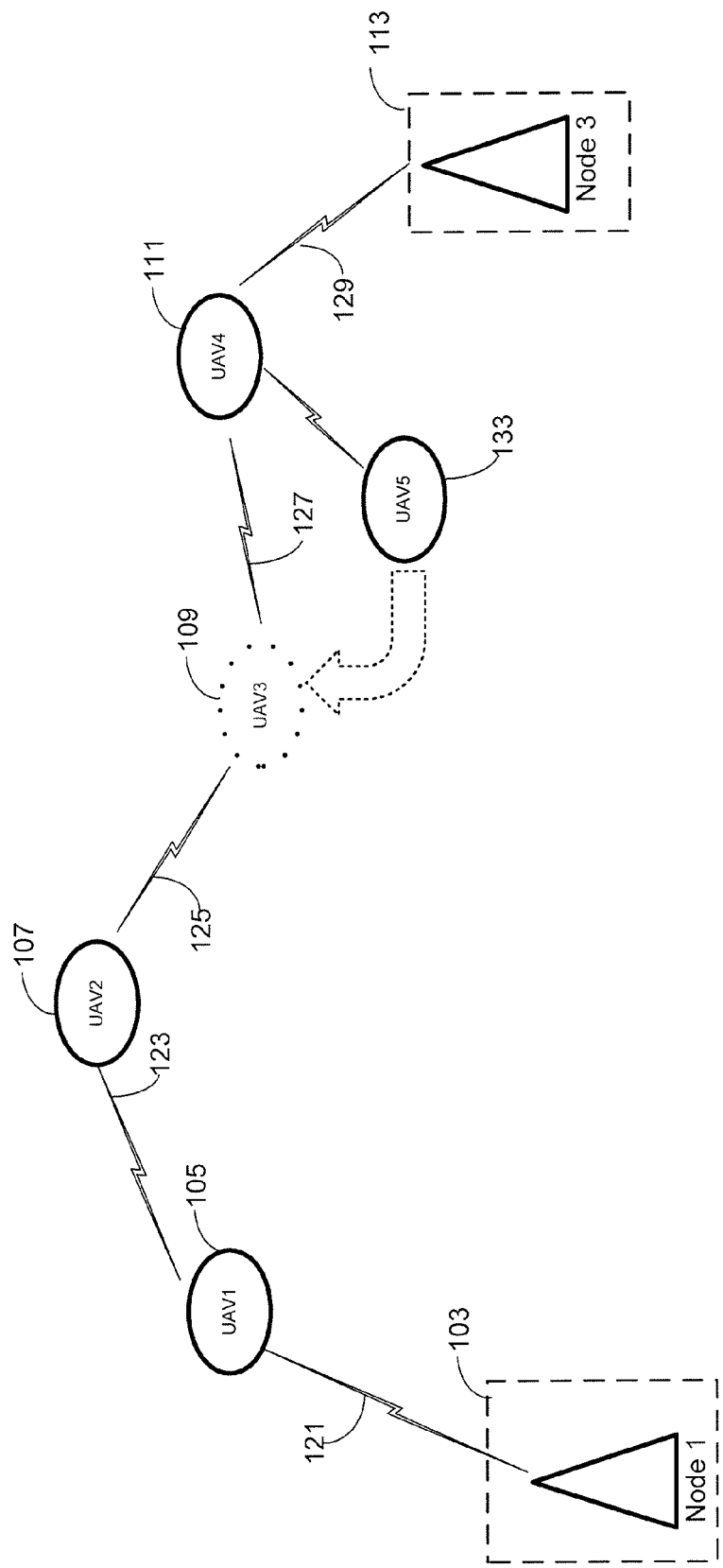
FIGS. 7A and 7B are an example diagram illustrating damage detection and repair of a wireless communication network in accordance with certain aspects of the present disclosure.

By way of example, FIG. 7A provides another illustrative example for detecting and repairing damage to a tentacle. It is assumed in FIG. 7A that the autonomous mobile node 109 is damaged (e.g., due to a mechanical failure or a hostile environment) and in out of communications with other autonomous mobile nodes, such as UAV 2 and UAV 4. As a result, the tentacle or the once complete wireless communication network between the origin node 103 and the destination node 113 is broken. It is also assumed that an autonomous mobile node 133, such as UAV 5, is an Extra node anchored to the autonomous mobile node 111, such as UAV 4, which is in a communication range of the tentacle.

In an aspect of the present disclosure, each autonomous mobile node is configured to check the status of its parent node and child node on a regular basis. In as aspect, one or more probing signals can be used to ensure the status of its parent and child nodes on regular basis. For example, at a predetermined time interval (e.g., 20 seconds) each autonomous mobile node may send a probe signal to its parent node and child node to check the status of the nodes. In one implementation, the probe signal may be a heartbeat signal sent by an autonomous mobile node to its neighboring autonomous mobile nodes (e.g., its parent and child nodes), and in response to the probe signal, the parent and child nodes each respond with a reply signal informing that the parent and child nodes are operational and are in communication with other nodes in the tentacle.

In another implementation, broadcast messages may be used to ensure the status of its parent and child nodes on a regular basis. For example, each autonomous mobile node may send a broadcast message to its parent and child nodes, informing that the autonomous mobile node is alive and operational. If the broadcast message is not received from either the parent node or the child node within a predefined time interval, such as 1 minute, then it may be assumed that either the parent node or the child node is damaged (e.g., hardware failure, software failure, etc.) and thus the tentacle is damaged. This process may also identify the location of damage to the tentacle, which is required for faster repair response.

In the example shown in FIG. 7A, by way of example, the autonomous mobile node 111 (or 107) expects a signal (e.g., a broadcast signal) from the autonomous mobile node 109 within a period of time (e.g., 1 minute), which may be a configurable parameter or a pre-set parameter that can be pre-programmed before launch or deployment. However, since the autonomous mobile node 109 is damaged (e.g., the autonomous mobile node 109 is down due to a mechanical failure), the autonomous mobile node 111 (or 107) fails to receive any signal and its timer expires. Upon expiration of the timer, the autonomous mobile node 111 (or 107) determines that the autonomous mobile node 109 is damaged or down. Further, the autonomous mobile node 111 (or 107) changes its role to Tip from Backbone and informs all other nodes (including adjacent neighboring nodes) to change their roles. For instance, an Extra node, such as the Extra node 133, will become a Free node, a Backbone node, such as a node 107, 105, or 111, will become a Tentacle node, and an Enhance node will become a Free node.

As a result, the Free node 133 autonomously moves to the location of the damaged node 109 and takes the place of the damaged node 109 in a tentacle formation. That is, the Free node 133 rebuilds the tentacle (e.g., complete the tentacle) by establishing wireless connectivity with both neighboring nodes, such as the autonomous mobile node 111 and the autonomous mobile node 107. The roles of the autonomous mobile nodes in the completed tentacle change to Backbone (including all Tentacle nodes becoming Backbone nodes) and any Free nodes associated with the tentacle become Extra nodes. As a result, the wireless communication network is re-established between the origin node 103 and the destination node 113, and damage to the wireless communication network is repaired autonomously by one or more of the autonomous mobile nodes deployed such as Extra nodes 133.

Figure 7B:
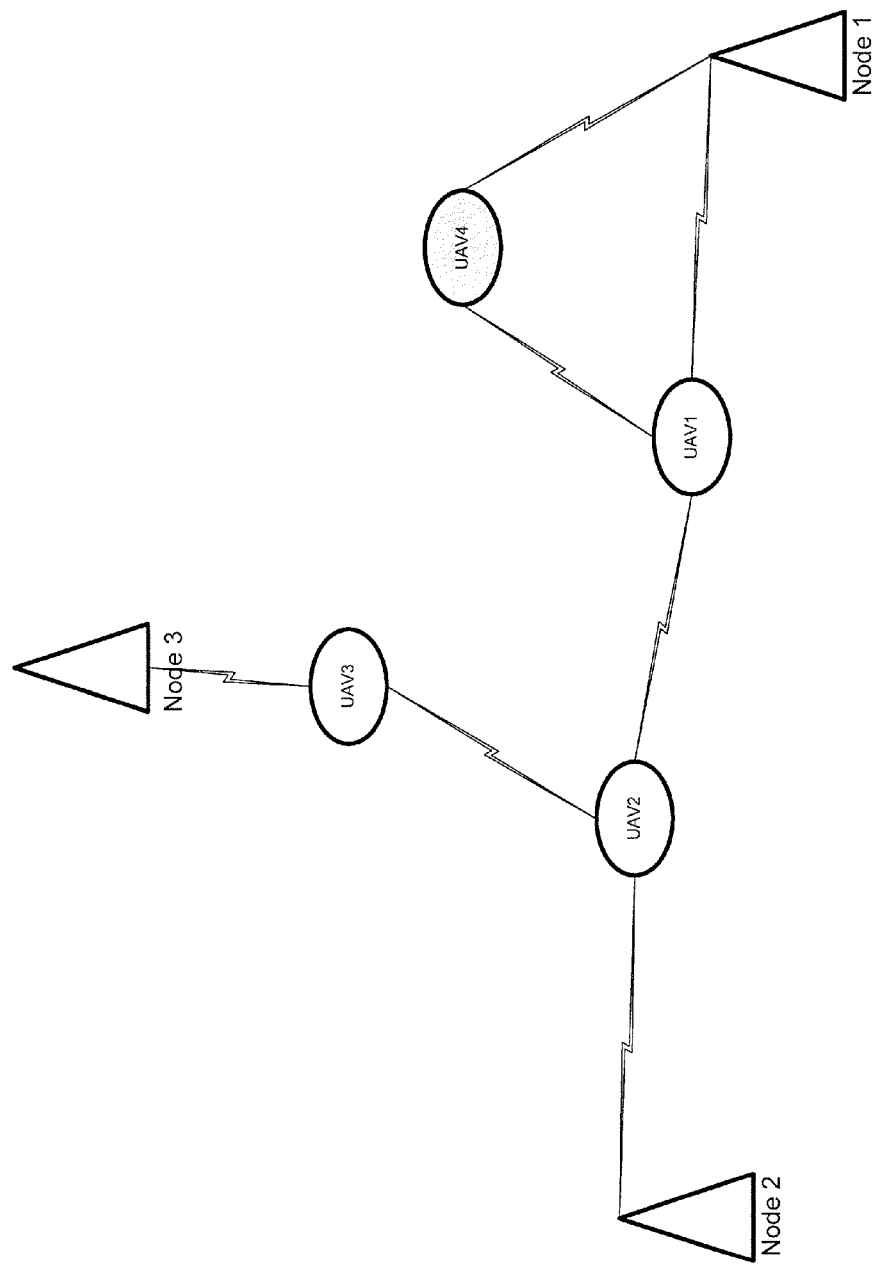

As noted above, when a tentacle is completed from an origin node to a destination node, all nodes in the tentacle become Backbone nodes, and all Free nodes become Extra nodes, which are associated with the tentacle. In accordance with certain aspects of the present disclosure, as shown in FIG. 7B, an Extra node may be used to enhance the completed tentacle. The Extra node may be configured to travel from one Backbone node to next Backbone (e.g., patrol the tentacle). If the current Backbone node K (UAV 1 or UAV 2) does not have any enhancement thereof, then the Extra node may change its role to Enhance and establish an enhancement relation with the Backbone node K as shown in the example in FIG. 7B. Alternatively, the Extra node (e.g., UAV 4) may stay close to the Backbone node K (e.g., UAV 1) within a communication range of the Backbone node K. Also, in an aspect, the tentacle may be evenly enhanced at the end of the tentacle. Further, as noted, when the tentacle is enhanced, the remaining Extra (e.g., UAV 3 or UAV 4) nodes may continue to patrol along the tentacle. As a result, using the present technology, a wireless communication network between an origin node and a destination node (or two nodes on the ground) may be autonomously built and maintained via one or more autonomous mobile nodes. Also, based on role changes of the one or more autonomous mobile nodes, any damage to the wireless communication network may be autonomously and efficiently detected and repaired. Further, critical portions of the wireless communication network or the tentacle may be autonomously enhanced by one or more autonomous mobile nodes associated with the tentacle.

Further, in an aspect of the present disclosure, one or more computer systems in the one or more autonomous mobile nodes associated with the tentacle may be configured to perform various functionalities relating to establishing, maintaining, repairing, and enhancing a wireless communications network using the one or more autonomous mobile nodes.

Further, the present technology disclosed herein thus facilitates collaborative sensing through one or more heterogeneous sensors attached to one or more nodes. In particular, a post-processed measurement from a sensor such as chemical, biological, optical, camera, radio, network, etc. can be transformed into field information including field strength and added onto the velocity computation to alter a node's trajectory as described herein.

In accordance with certain aspects of the present disclosure, the present technology can be used to track movement of a second node on the ground (e.g., a friendly or hostile destination) for surveillance purposes and tactical missions using video or image sensor(s) on board. The virtual attraction field 501 shown in FIG. 5 may be replaced by a sensed field whose magnitude is proportionate to distance from the sensed object. Such information can be extracted from the image sensor(s) with separate object recognition software.

Figure 8:
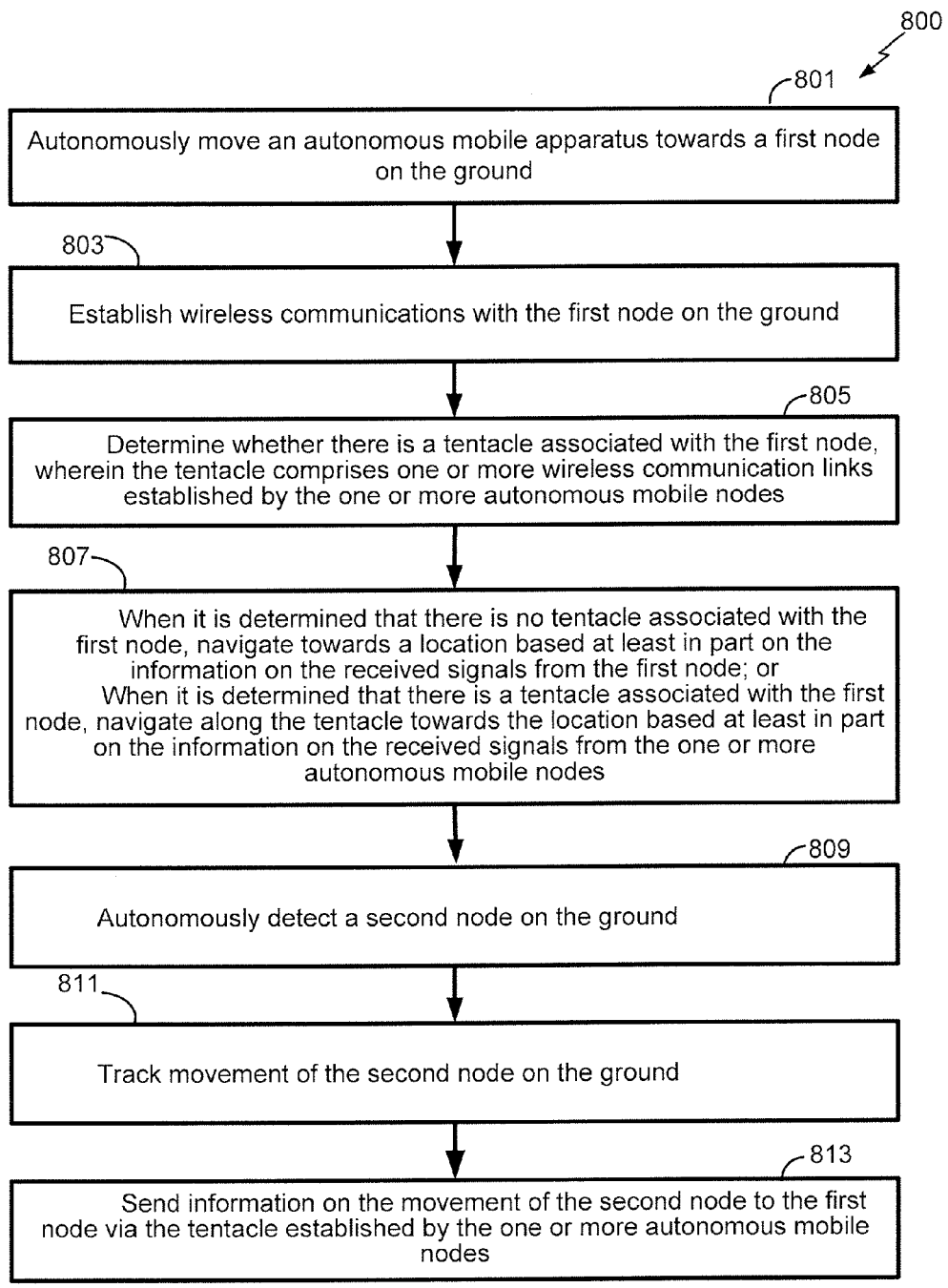
FIG. 8 is an example flowchart in accordance with certain aspects of the present disclosure.

By way of example, FIG. 8 illustrates an example methodology for tracking the movement of the second node on the ground using one or more on board video/image sensors. At 801, one or more autonomous mobile nodes (or an autonomous mobile apparatus) fly or move towards a first node on the ground. By way of example, a flight component 1030 or a navigation towards a location component 1037 of an autonomous mobile communication component 1004 shown in FIG. 10B may navigate the autonomous mobile node to the first node on the ground.

At 803, the autonomous mobile apparatus establishes wireless communications with the first node on the ground. By way of example, an establishing wireless communication component 1033 of the autonomous mobile communications component 1004 shown in FIG. 10B may be used to establish the wireless communications with the first node on the ground.

At 805, the autonomous mobile apparatus determines whether there is a tentacle (e.g., one or more tentacles) associated with the first node, where the tentacle comprises one or more wireless communication links established by the one or more autonomous mobile nodes. By way of example, a tentacle detection component 1035 of the autonomous mobile communication component 1004 may be used to determine whether there is a tentacle associated with the first node.

At 807, when it is determined that there is a tentacle associated with the first node, the autonomous mobile apparatus navigates towards the second location based at least in part on the information on the received signals from the one or more autonomous mobile nodes. When it is determined that there is no tentacle associated with the first node, the autonomous mobile apparatus navigates towards the second location based at least in part on the information on the received signals from the first node. By way of example, the flight component 1030 or navigation towards a location component 1037 of the autonomous mobile communication component 1004 may be used to navigate the autonomous mobile node towards the second location after the determination.

At 809, using one or more autonomous mobile apparatuses the second node on the ground is detected. The detection of the second node can be performed by using equipment on board such as video and/or image processing equipment (e.g., camera sensor 1103 and/or geo-location sensor 1102 shown in FIG. 11). The autonomous mobile apparatus may be equipped with video capturing or image processing equipment. When the tentacle grows such that the autonomous mobile apparatus comes within a video surveillance range of the equipment for the second node on the ground, the autonomous mobile apparatus searches and detects presence of the second node on the ground based on data received from one or more sensors (e.g., video surveillance sensors or image sensors such as camera sensor 1103) on board and/or information received from the one or more autonomous mobile nodes, as follows: (i) the digital signal processing algorithm software module operating in the video capturing or image processing equipment constantly identifies and analyzes identified objects (e.g., face detection and recognition) and compares against known set of objects (target objects); (ii) if a match is found, the matching percentage is expressed as signal quality and translated into the appropriate field strength as depicted in FIG. 4; (iii) once the presence of the second node on the ground is detected based on the received data from the one or more sensors on board, video data relating to the second node is captured and relayed back to the first node via one or more deployed autonomous mobile nodes in the tentacle. The above digital signal processing algorithm software module (or video sensor digital signal processing equipment) may be implemented via one or more processors 1003 as shown in FIG. 10A.

At 811, the movement of the second node on the ground is monitored and tracked by the on board video surveillance sensor. The speed and/or direction of the movement of the second node on the ground are constantly estimated and updated by the video sensor digital signal processing equipment, and their values control the motion (e.g., flying) of the autonomous mobile node which detected the target object. By way of example, the monitoring and tracking of the movement of the second node on the ground may be performed by at least one of the processing system 1001, the autonomous mobile communication component 1004, etc., based on the measurement data from the camera sensor 1103.

Further, at 813, information collected on the movement of the second node on the ground is sent to the first node via the tentacle established by the one or more autonomous mobile nodes. In addition, or alternatively, the information collected on the movement of the second node on the ground may be transmitted to all the nodes via the tentacle. Therefore, as the tracked second node moves, the tentacle may extend, shrink or curve in response to the change in the movement of the tracked second node (e.g., in response to the change in the direction of a destination node field). By way of example, the establishing wireless communication component of the autonomous mobile communication component 1004 of the autonomous mobile node shown in FIG. 10B may be used to transmit the information to the nodes. As a result, using the present technology described herein, a destination node for surveillance can be autonomously detected and monitored using one or more autonomous mobile nodes.

Figure 9A:
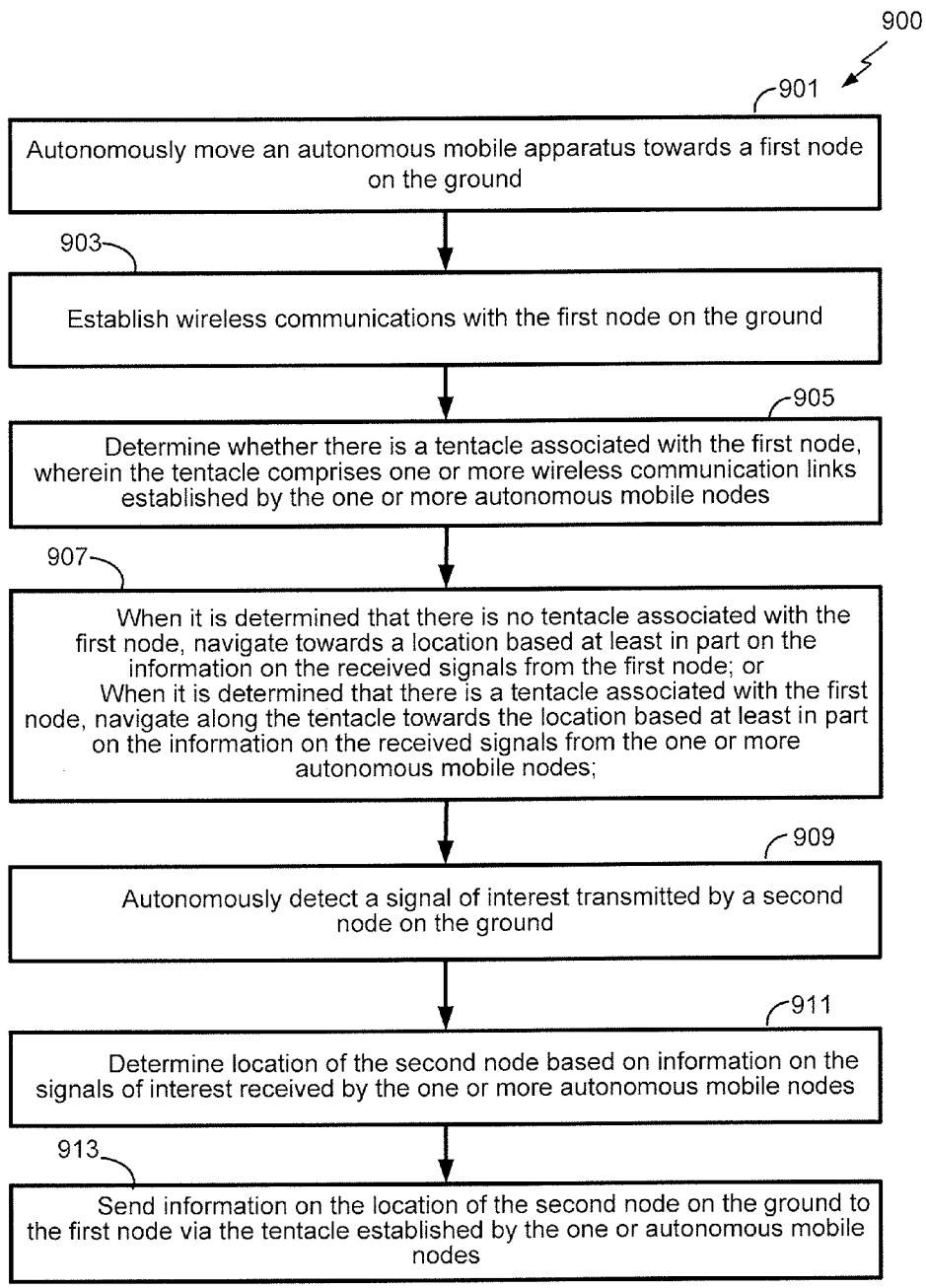
FIGS. 9A and 9B are example flowcharts in accordance with certain aspects of the present disclosure.

Further, in accordance with certain aspects of the present disclosure, the present technology can also be used to identify or determine geographical location of a second node on the ground (e.g., a friendly or hostile destination) using radio frequency (RF) geo-location sensor on board. By way of example, FIG. 9A illustrates an example methodology for determining the location of the second node on the ground by detecting and tracking the RF signal emitted by the second node on the ground.

At 901, one or more autonomous mobile nodes including an autonomous mobile apparatus fly (or move) towards a first node on the ground. By way of example, the flight component 1030 or the navigation towards a location component 1037 of the autonomous mobile communication component 1004 shown in FIG. 10B may be used to navigate the autonomous mobile node to the first node on the ground.

At 903, the autonomous mobile apparatus establishes wireless communications with the first node on the ground. By way of example, the establishing wireless communication component 1033 of the autonomous mobile communications component 1004 shown in FIG. 10B may be used to establish the wireless communications with the first node on the ground.

At 905, the autonomous mobile apparatus determines whether there is a tentacle (e.g., one or more tentacles) associated with the first node, where the tentacle comprises one or more wireless communication links established by the one or more autonomous mobile nodes. By way of example, the tentacle detection component 1035 of the autonomous mobile communication component 1004 may be used to determine whether there is a tentacle associated with the first node.

At 907, when it is determined that there is a tentacle associated with the first node, the autonomous mobile apparatus navigates towards a location based at least in part on the information received from the one or more autonomous mobile nodes. When it is determined that there is no tentacle associated with the first node, the autonomous mobile apparatus navigates towards the location based at least in part on the information on the received signals from the first node. By way of example, the flight component 1030 or navigation towards a location component 1037 of the autonomous mobile communication component 1004 may be used to navigate the autonomous mobile node towards the location after the determination.

At 909, the autonomous mobile apparatus detects a signal of interest transmitted by the second node on the ground. For example, the autonomous mobile apparatus may be equipped with RF signal detection equipment on board. As the tentacle grows, the autonomous mobile apparatus scans for presence of a signal of interest within its wireless communication range, where the RF signal of interested may be transmitted by the second node on the ground. Any existing RF signal detection techniques may be used to detect the signal of interest from the second node on the ground. When the tentacle grows such that the autonomous mobile apparatus comes within a RF signal detection range for detecting presence of the second node on the ground, the autonomous mobile apparatus searches and detects the presence of the second node on the ground as follows: (i) the RF signal detection algorithm software module operating in conjunction with the RF geo-location sensor on board constantly identifies signals and analyzes the identified signals (e.g., modulation type, signal bandwidth, center frequency, and so forth), and compares them against a known set of signals in the search list; (ii) if a match is found, the corresponding signal's quality is translated into field strength as depicted in FIG. 4. By way of example, the RF signal detection and tracking may be performed by using at least one of the processing system 1001, geo-location sensor 1102, and the autonomous mobile communication component 1004 (e.g., flight component 1030 or navigation towards a location component 1037), etc. Further, the RF signal detection algorithm software module may be implemented via one or more processors 1003 as shown in FIG. 10A.

Further, (iii) once the presence of the second node is detected, details on the identified signal relating to the second node are captured and relayed back to the first node via one or more deployed autonomous mobile nodes in the tentacle; (iv) upon receiving the detected signal information transmitted over the entire tentacle, one or more extra autonomous mobile apparatuses coupled to the tentacle then move (e.g., fly) towards the first autonomous mobile apparatus till it detects the target second node on the ground. When at least three autonomous mobile nodes detect the same target second node using their respective on board RF signal detection sensor in conjunction with respective signal processing module or equipment, they communicate with each other their own coordinates (using on board PS) and estimate the location information (e.g., location coordinates) of the second node using a method of triangulation or the like; (v) as the second node may be mobile, the autonomous mobile nodes which detected the second node on the ground may each adjust its location to maintain a good signal match quality, and continuously share theirs coordinates to update the estimated location information of the second node on the ground.

At 913, the information on the determined location of the second node on the ground is sent to the first node via the tentacle established by the one or more autonomous mobile nodes. By way of example, the processing system 1001 or the autonomous mobile communication component 1004 may be configured to send the information to the first node via the tentacle. As a result, the present technology described herein can be used to autonomously detect and locate the second node of interest on the ground using one or more on board RF signal detection sensors of the one or more autonomous mobile nodes.

Figure 9B:
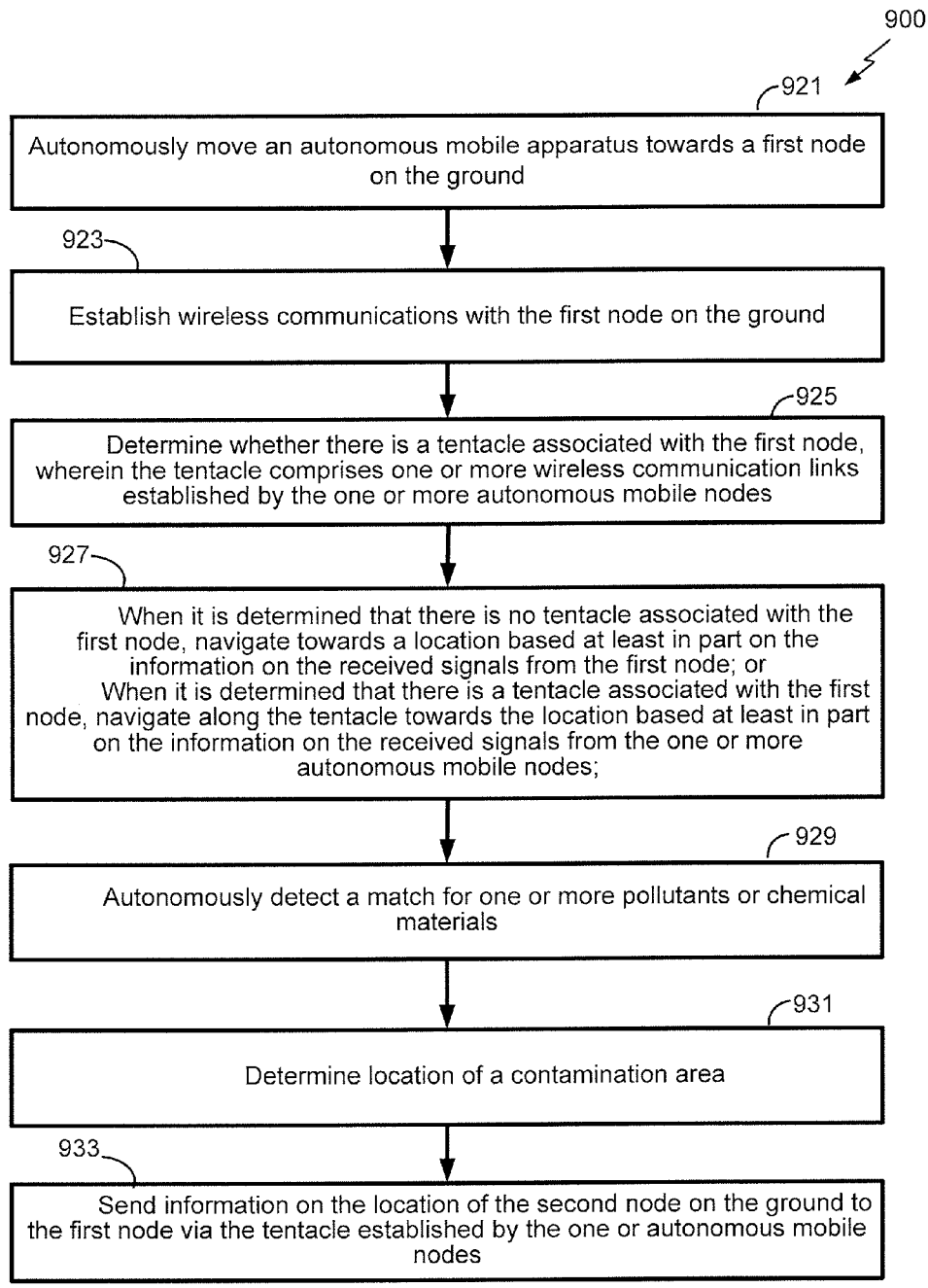

Further, in accordance with certain aspects of the present disclosure, as shown in FIG. 9B, the present technology can also be used to identify or determine geographical area contaminated by toxic pollutants or contaminant materials using one or more on board biological or chemical sensors. In this case, the second node may refer to a central location of a detected contamination area. By way of example, FIG. 9B illustrates an example methodology for determining the contamination area on the ground or in the air by detecting and tracking a level of contamination of target pollutants or chemicals around the second node.

At 921, one or more autonomous mobile nodes including an autonomous mobile apparatus fly (or move) towards a first node on the ground. By way of example, the flight component 1030 or the navigation towards a location component 1037 of the autonomous mobile communication component 1004 shown in FIG. 10B may be used to navigate the autonomous mobile node to the first node on the ground.

At 923, the autonomous mobile apparatus establishes wireless communications with the first node on the ground. By way of example, the establishing wireless communication component 1033 of the autonomous mobile communications component 1004 shown in FIG. 10B may be used to establish the wireless communications with the first node on the ground.

At 925, the autonomous mobile apparatus determines whether there is a tentacle (e.g., one or more tentacles) associated with the first node, where the tentacle comprises one or more wireless communication links established by the one or more autonomous mobile nodes. By way of example, the tentacle detection component 1035 of the autonomous mobile communication component 1004 may be used to determine whether there is a tentacle associated with the first node.

At 927, when it is determined that there is a tentacle associated with the first node, the autonomous mobile apparatus navigates towards the pre-programmed second location (because it is before detection) based at least in part on the information on the received signals from the one or more autonomous mobile nodes. When it is determined that there is no tentacle associated with the first node, the autonomous mobile apparatus navigates towards the second location based at least in part on the information on the received signals from the first node. By way of example, the flight component 1030 or navigation towards a location component 1037 of the autonomous mobile communication component 1004 may be used to navigate the autonomous mobile node towards the second location after the determination.

At 929, the autonomous mobile apparatus detects a match for one or more pollutants or chemical materials (or a target contaminant material). For example, the autonomous mobile apparatus may be equipped with biological and/or chemical sensor equipment on board. As the tentacle grows, the autonomous mobile apparatus scans for presence of a pollutant or chemical within its sensing range. When the tentacle grows such that the autonomous mobile apparatus comes within a biological or chemical detection range for a contaminated area, the autonomous mobile apparatus searches and detects presence of the contaminated area as follows: (i) the biological or chemical material detection algorithm software module operating in the biological or chemical sensor on board constantly analyzes identified compounds captured by the biological or chemical sensor; (ii) if a match is found, the signal quality indicating the normalized concentration of material is translated to the appropriate field strength as depicted in FIG. 4; (iii) once the presence of the target contamination material is detected, details on the identified material relating to the contamination may be captured and relayed back to the first node via one or more deployed autonomous mobile apparatuses in the tentacle; (iv) upon receiving the detected signal information transmitted over the entire tentacle, one or more extra autonomous mobile apparatus attached to the tentacle then moves (e.g., flies) towards the first autonomous mobile apparatus till it detects the same contamination field. Each of the new autonomous mobile apparatuses detecting the same contamination then begins to surround the contamination area as a result of the attraction and repulsion field strengths constantly updated by the autonomous mobile apparatuses based on the detection match quality and respective locations of the autonomous mobile apparatuses. Further, the biological or chemical material detection algorithm software module may be implemented via one or more processors 1003 as shown in FIG. 10A.

At 931, with additional autonomous mobile apparatuses detecting the same contamination area using their respective on board biological/chemical sensors, the autonomous mobile apparatuses communicate with each other their own coordinates (using on board GPS) to approximate the area of contamination; (v) as the contamination area may be changing, the autonomous mobile apparatuses which detected the contamination adjusts its location to maintain a good contamination match quality, and continuously share theirs coordinates to update the estimated contamination area. By way of example, the detection and communication of the information on the contamination area may be performed by using one or more of the processor 1003, the autonomous mobile communication component 1004, the chemical or biological sensors, etc.

At 933, the information on the estimated contamination area (i.e., the center location of the area identified as the second node location) is sent to the first node via the tentacle established by the one or more autonomous mobile nodes. By way of example, the processing system 1001 or the autonomous mobile communication component 1004 may be configured to send the information to the first node via the tentacle.

As a result, the present technology described herein can be used to autonomously detect contamination and estimate the approximate contamination area using one or more autonomous mobile apparatuses equipped with on board biological or chemical sensors.

Various aspects of the present disclosure including aspects of the flow charts shown in FIGS. 2, 9A, and 9B may be implemented using hardware, software, or a combination thereof and may be implemented in one or more computer systems or other processing systems. Further, in accordance with various aspects of the present disclosure herein, one or more functionalities may be implemented with a "processing system" that may include one or more processors. Examples of such a processing system may include a computer system with a single- or multi-core processor, communication bus such as USB or Ethernet, one or more transceivers, and one or more onboard sensors, as shown in FIG. 10A.

FIG. 10A shows a system diagram illustrating an example of a hardware implementation of an apparatus 1000 of an autonomous mobile node. The autonomous mobile node may include one or more apparatuses 1000 which include at least one processing system 1001. Also, alternatively, the apparatus 1000 can be any communications device embodied in the autonomous mobile node or a ground node. The processing system 1001 or the apparatus 1000 may be implemented as either a client or a server in a client-server environment or a distributed computing environment.

In one implementation, the apparatus 1000 may include the processing system 1001, a transceiver interface 1006, a sensor interface 1007, a navigation interface 1008, and optionally a user (human operator) interface 1009. The processing system 1001 may be a general purpose computer typically comprising a central processing unit or other processing device(s), an internal communication bus, various types of memory or storage media for instructions/code and data storage, and one or more network interface cards or ports for communication purposes. By way of example, the processing system 1001 includes one or more communications buses (generally represented as a communication bus 1002), one or more processors (generally represented by a processor 1003), computer-readable media (generally represented as a computer-readable medium 1005 including a non-transitory computer-readable medium), and one or more autonomous mobile communication components (generally represented as an autonomous mobile communication component 1004). In the present disclosure, the processing system 1001 may be configured to implement various functions or aspects of the present technology as depicted in flow charts, process diagrams, algorithms described herein.

The communication bus 1002 may include any number of interconnecting buses, cables, or bridges depending on the specific application of the processing system 1001 and the overall design constraints. The communication bus 1002 is configured to link together various circuits including the one or more processors 1003, and the computer-readable medium 1005, and the autonomous mobile communication component 1004. The communication bus 1002 may also link various other circuits such as timing sources, peripherals, voltage regulators, and power management circuits, which are well known in the art, and therefore, will not be described any further. Various communication interface(s) may be provided to transfer data among various components, such as the processor 1003, computer-readable medium 1005, autonomous mobile communication 1004, transceiver interface 1006, sensor interface 1007, navigation interface 1008, user (human operator) interface 1009, etc. Examples of the communication interface may include a network interface such as an Ethernet (10/100/1000 Mbps), a serial communication port such as USB, Firewire, and RS-232, and customized circuits optimized for fast and reliable communication with individual interfaces attached.

In the example, the autonomous mobile communication component 1004 may include a hardware component, a software component, or a combination of both to implement various features or functionalities described herein relating to autonomous mobile communications functions including functions relating to navigating an autonomous mobile node, forming a tentacle, monitoring, maintaining, and repairing any damage to the tentacle, etc. The autonomous mobile communications may be implemented by the autonomous mobile communication component 1004, either alone or in combination with the processor 1003.

Figure 10B:
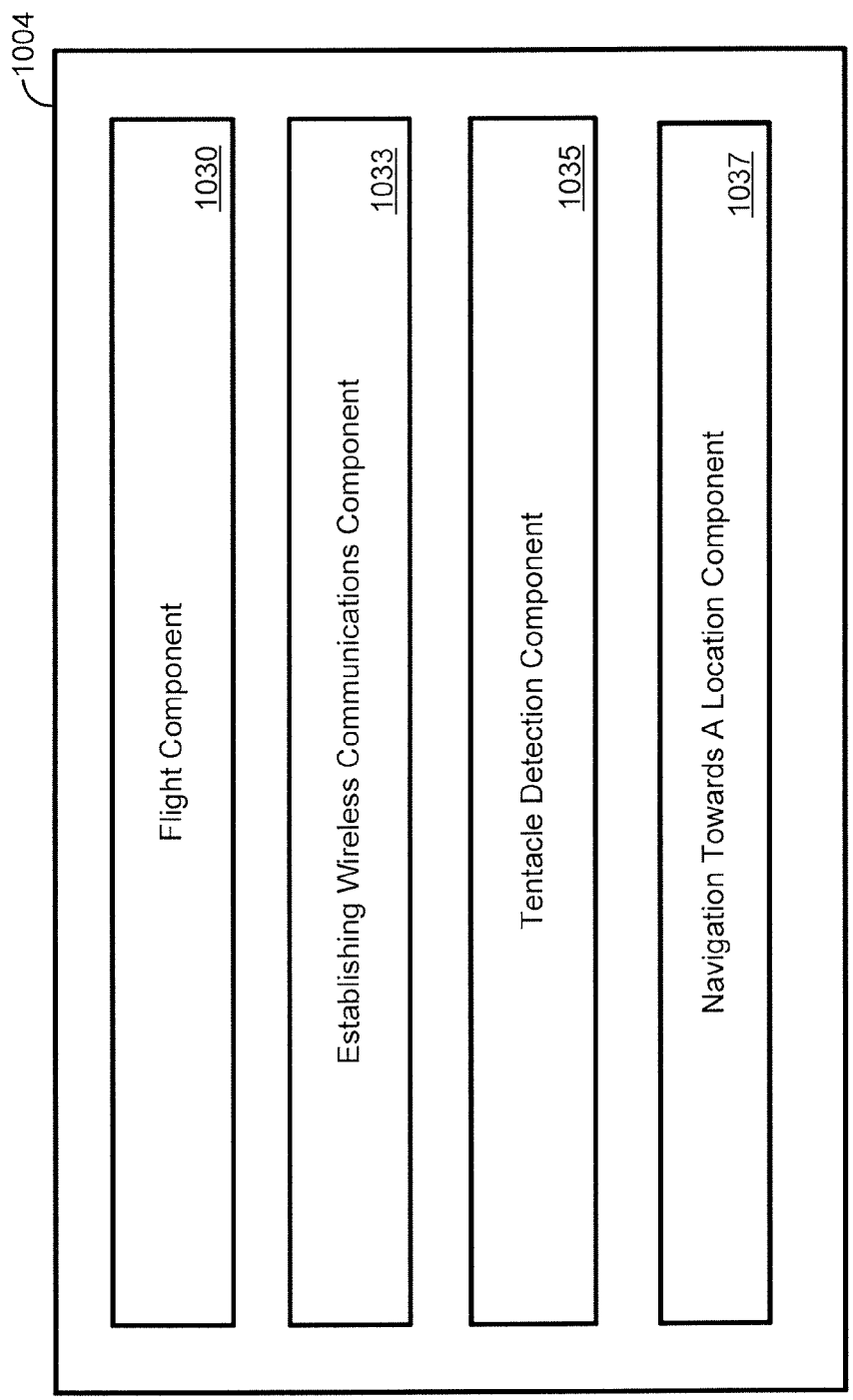

By way of example, as shown in FIG. 10B, the autonomous mobile communication component 1004 may include a flight component 1030, an establishing wireless communications component 1033, a tentacle detection component 1035, and a navigation towards a location component 1037. The flight component 1030 may be implemented as a component or module (e.g., hardware, software, or combination thereof) and is configured to autonomously fly an autonomous mobile node (or apparatus) towards a first node, which may be on the ground. The establishing wireless communication component 1033 may be implemented as a component or module (e.g., hardware, software, or combination thereof) configured to establish wireless communications with various nodes (e.g., the first node and/or second node on the ground) or other autonomous mobile nodes deployed in the air. The tentacle detection component 1035 may be implemented as a component or module (e.g., hardware, software, or combination thereof) configured to determine whether there is a tentacle associated with the first node on the ground or with one or more autonomous mobile nodes deployed in the air, where the tentacle comprises one or more wireless communication links established by the one or more autonomous mobile nodes. The navigation towards a location component 1037 may be implemented as a component or module (e.g., hardware, software, or combination thereof) configured to navigate the autonomous mobile node to a first location of the first node, or navigate along the tentacle towards a second location toward the second node, based at least in part on information received from the one or more sensors onboard on the autonomous mobile node, when it is determined that there is a tentacle associated with the first node. The navigation towards a location component 1037 may be further configured to navigate the autonomous mobile node towards the second location based at least in part on the information received from the first node, when it is determined that there is no tentacle associated with the first node. Alternatively, the navigation towards a location component 1037 may also be configured to navigate the autonomous mobile node towards the second location based at least in part on measurement data from one or more sensors onboard the autonomous mobile node.

Referring back to FIG. 10A, the processing system 1001 may include the one or more processors 1003. The processor 1003 may include digital signal processors (DSPs), microprocessors, micro-controllers, gate arrays including field programmable gate arrays (FPGAs), programmable logic devices (PLDs), discrete hardware circuits, or other suitable hardware configured to perform the various functionalities described herein. The processor 1003 may be configured to be responsible for managing the communication bust 1002 and general processing, including execution of software or instructions stored on the computer-readable medium 1005. The software or instructions may include instructions for code for causing the processing system to perform various functions or operations relating to the autonomous mobile communications functions including functions relating to navigating an autonomous mobile node, forming a tentacle, monitoring, maintaining, and repairing any damage to the tentacle, or the like. That is, the software, when executed by the processor 1003, may cause the processing system 1001 to perform various functions including functionalities relating to the present technology described herein. Also, the computer-readable medium may store data that are manipulated by the processor 1003 when executing software. That is, the software functionalities may involve programming, including executable instructions or code as well as associated stored data, e.g., files used for implementing techniques for the present technology disclosed herein including functions to autonomously establish, monitor, maintain, repair a wireless communication network using autonomous mobile nodes deployed in the air, etc.

In the present disclosure, software broadly include instructions, instruction sets, code, program code, programs, subprograms, software modules, applications, routines, objects, executables, procedures, functions, hardware description language, etc. The software may reside on a non-transitory computer-readable medium. The non-transitory computer-readable medium may include, by way of example, a magnetic storage device (e.g., a hard disk, a floppy disk, a magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a processor. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. Further, the software may be stored at other locations and/or transported for loading into an appropriate processing system. Software code or instructions for applications or other programming for the appropriate general purpose computer including the processing system may be stored at a different network location (e.g., a remote server) and wirelessly transmitted through a network for storage in memories of the processing system.

The transceiver interface 1006 provides a means for communicating wirelessly with other apparatus, such as an origin node, a destination node, or an autonomous mobile node. The transceiver interface 1006 may be configured to support short and/or long range wireless communications protocols including Ultra Mobile Broadband (UMB), IEEE 802.11 (Wi-Fi), IEEE 802.16 (WiMAX), IEEE 802.20, Ultra-Wideband (UWB), Bluetooth, and/or other suitable protocols. Alternatively, the transceiver interface 1006 may also support any other proprietary wireless communications protocols.

Figure 11:
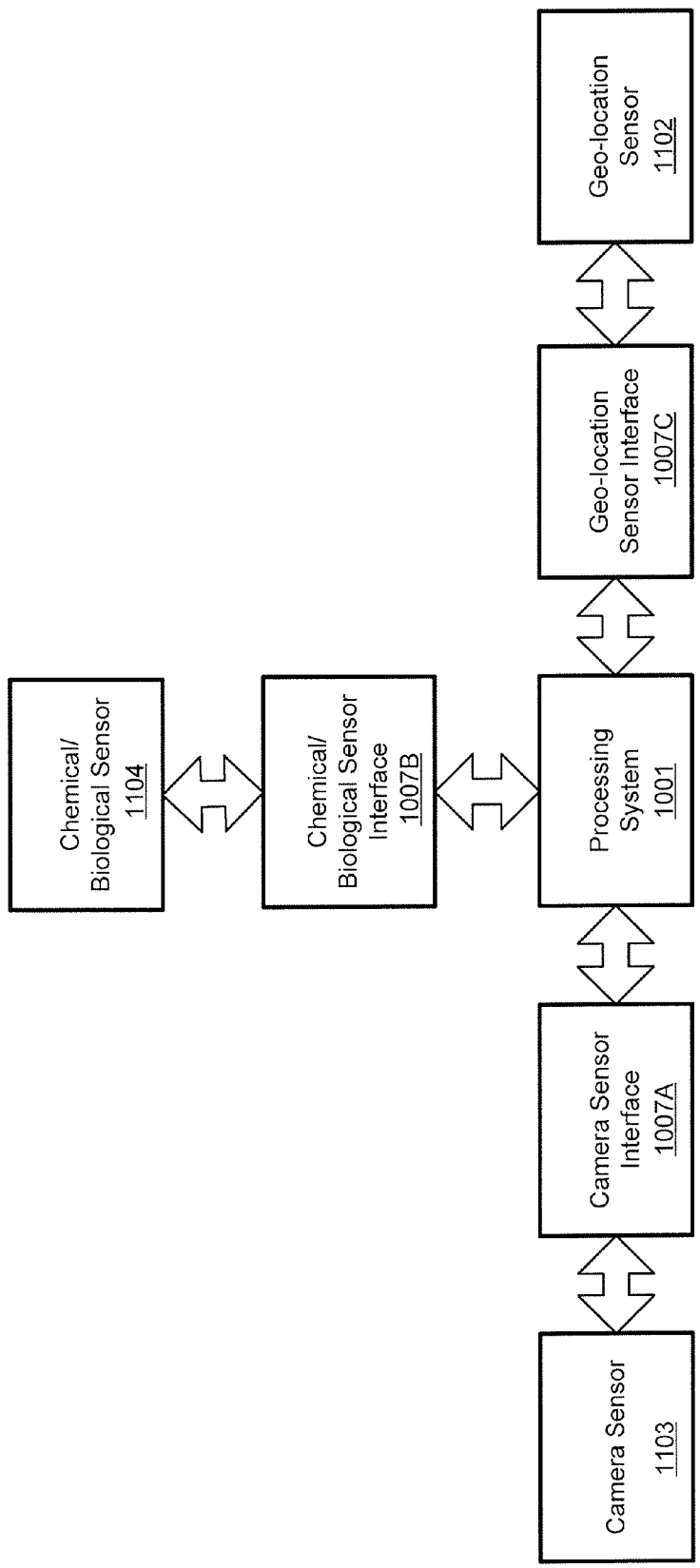
FIG. 11 illustrates a functional block diagram conceptually illustrating interactions between a processing system and various on board sensors.

The sensor interface 1007 provides an interface for communicating with one or more sensors on board an autonomous mobile node (as shown in FIG. 11). Also, the sensor interface 1007 may include an interface which is often referred to as "Application Programming Interface" (API). The API may be implemented in the form of a "device driver" software module with respect to Processor 1003 inside the processing system 1001. When requested by a system function call running inside the processing system 1001, via this API, the requested sensor interface connected to the processing system 1001 provides data in the form of a tuple, for example, <function name, timestamp, device identifier, send/receive data direction flag, sensor's internal parameter/object classification identifier, number of data fields, array of data values> to the processor 1003 via the API. Further, each sensor on board may be configured to convert its own sensor data to this tuple format either periodically (e.g., every 3 seconds) or upon request by the processing system 1001 via the API. Examples of candidate sensor platforms may include, but not limited to, geo-location sensors including GPS, radio frequency sensors, network quality sensors, chemical sensors, biological sensors, camera/image sensors, etc., which may be installed on each autonomous mobile node.

The navigation interface 1008 provides a means for communicating with an autopilot module or components of the autonomous mobile node. The autopilot component provides an API through which the apparatus 1000 can obtain or receive data, such as various location information, e.g., GPS coordinates of interest, and issue commands, such as a move command to fly the autonomous mobile node to a specified coordinate location.

Figure 10C:
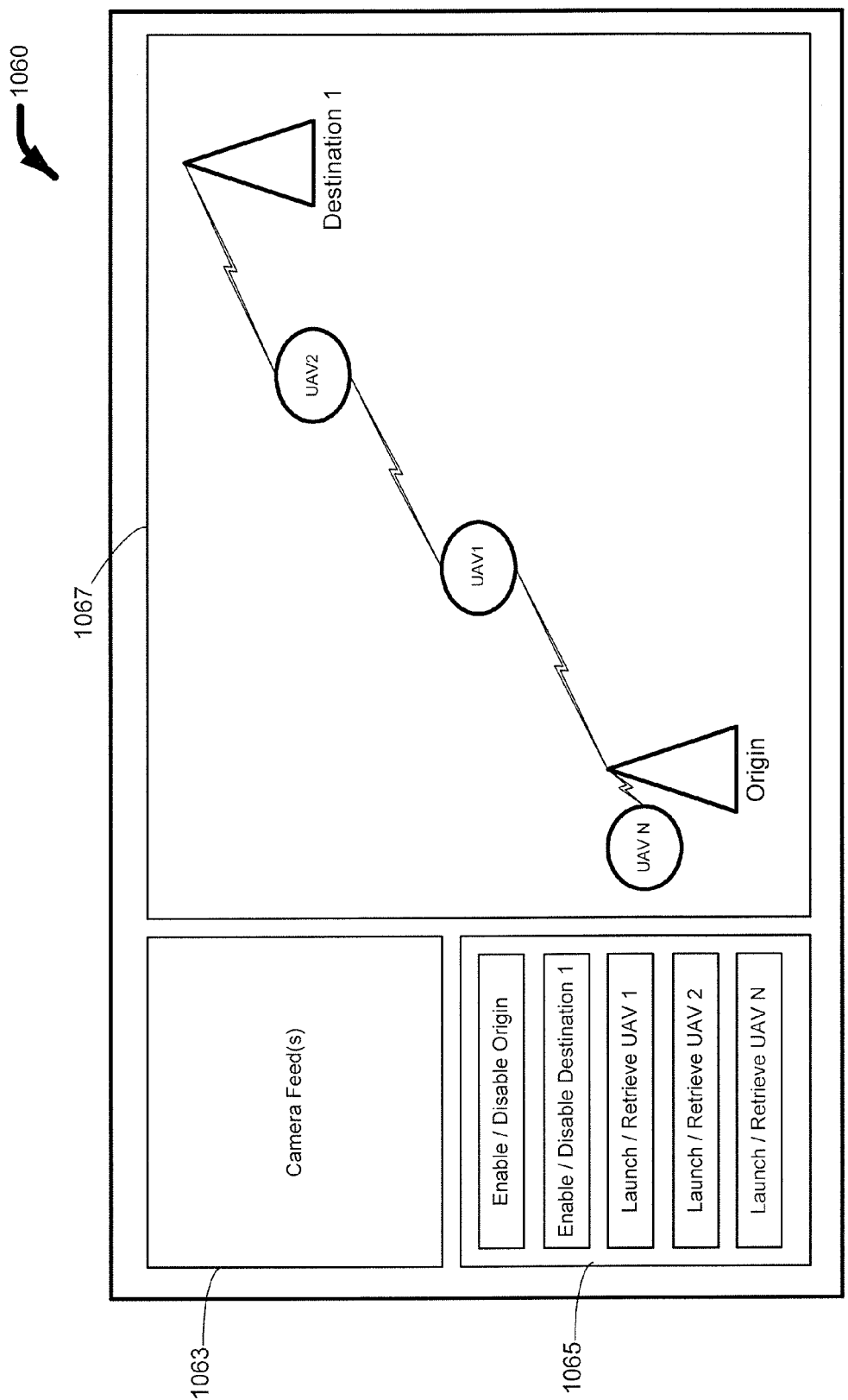

The user (human operator) interface 1009 is an optional component which may include a keypad, a display, a speaker, a microphone, a joystick, or other user interface elements. The user interface 1009 may be used to communicate with the processing system 1001. The user interface 1009 may be coupled to the autonomous mobile node. Alternatively, the user interface 1009 may be coupled to the origin node and may be configured to present a graphical user interface (GUI) on an operator console. In one implementation, the location information of an origin node and/or a destination node can be input to the processing system 1001 of the autonomous mobile node or the origin node via the user interface 1009 before launch or deployment. Also, as noted above, the user interface 1009 may be used to produce an example of a GUI on the operator console, as shown in FIG. 10C. The GUI interface of FIG. 10C may help a human operator on the operator console to monitor and/or override certain autonomous behavior of any networked autonomous mobile node. The GUI 1060 may be configured to present multiple graphical areas such as a camera feed view 1063, a node control 1065 of one or more autonomous mobile nodes, and a graphical network view 1067. The camera feed view 1063 may display real time images from an autonomous mobile node in the air. The node control 1065 provides the operator with capability to control (e.g., enable or disable) the origin node or destination node, and launching or retrieving one or more autonomous mobile nodes (e.g., UAV 1, UAV 2, . . . , and UAV N). The graphical network view 1067 may present a graphical representation of the communication network established between the origin node and the destination node via the one or more autonomous mobile nodes.

FIG. 11 illustrates a functional block diagram conceptually illustrating interactions between a processing system and various on board sensors. As shown in FIG. 11 is a system diagram illustrating how the processing system 1001 may use the various sensor interfaces including three exemplary sensors: geo-location sensor (1102), camera sensor (1103), and chemical/biological sensor (1004). As noted above, each of the sensor interfaces 1007A, 1007B, and 1007C provides a means for communicating with the respective onboard sensor platform. Specifically, each of the three interfaces (1007A, 1007B, and 1007C) provides data in the form of tuple, that is, <function name, timestamp, device identifier, send/receive data direction flag, sensor's internal data/object classification identifier, number of data fields, array of data values>, either periodically or upon request by the processor 1003.

In certain aspects of the present disclosure, various measurement data, such as GPS, received signal quality, communication quality measurements in terms of signal strength, alternate sensors or measurement metrics may be used. The alternate sensors or measurement metrics may include other radio frequency measurements via the radio frequency based geo-location sensor 1102 (e.g., from Cognitive Radio Architectures), camera identification or object tracking measurements via the camera or image sensor 1103, biological or chemical sensor measurements of air composition via the chemical/biological sensor 1104, network measurements, such as message delivery quality, etc., via a network quality sensor. These sensors or sensor systems may be configured to provide improved situational awareness such as the criticality of each node in a communication network or a tentacle.

In an aspect, the processing system 1001 may include a critically sensitive control (CSC) component, which determines the criticality or importance of an autonomous mobile node within the communication network, and attempts to reinforce important locations in the tentacle. For example, using the geo-location sensor 1102, the criticality of an autonomous mobile node at a specific location may be determined by a measured amount of data traffic passing through the autonomous mobile node (e.g., measured in Mbps), or determined by a priority of one or more messages being routed through the autonomous mobile node.

Further, each autonomous mobile node may be assigned a criticality value based on the measured amount of data traffic passing through the autonomous mobile node or the priority of the one or more messages being routed through the autonomous mobile node. When the criticality value of an autonomous mobile node exceeds a predetermined threshold, the CSC component may ensure that any available Extra nodes are guided towards that autonomous mobile node and positioned between its parent and child nodes, thereby reinforcing a segment of the tentacle established by the autonomous mobile node with the high criticality value. Essentially, each strategically placed Extra node may reinforce the network by reducing the criticality of neighboring nodes by routing some of their traffic through it. Further, in an aspect of the present disclosure, the CSC component or functionality can reside in the origin node or any one of the one or more autonomous mobile nodes forming the tentacle originating from the origin node.

Figure 12A:
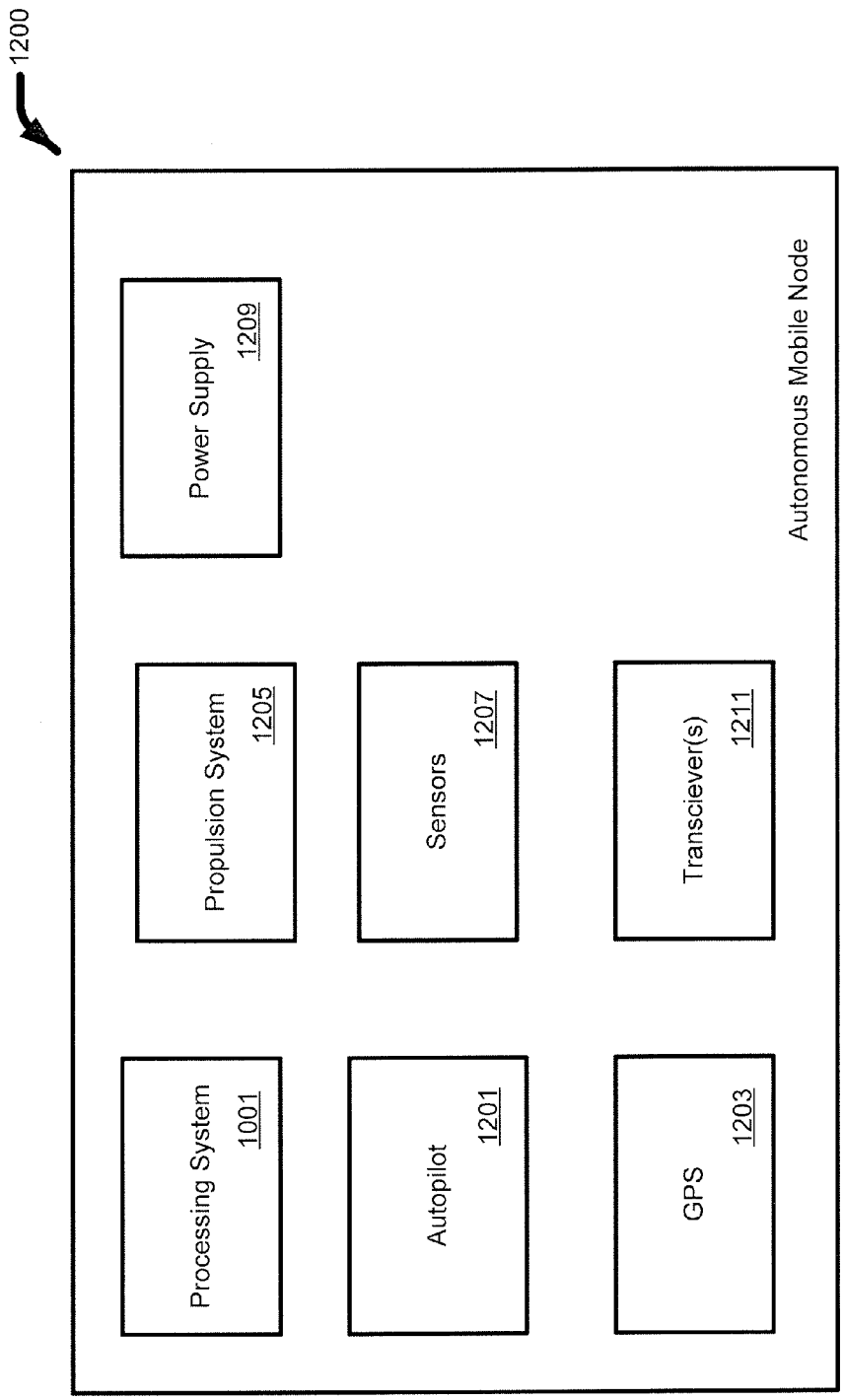
FIGS. 12A, 12B, and 12C conceptually illustrate components of an apparatus in certain aspects of the present disclosure.

FIG. 12A illustrates another example of a block diagram conceptually illustrating an autonomous mobile node (AMN) 1200, such as UAV 1, including some example components. The autonomous mobile node 1200 shown in FIG. 12A is configured to include at least a processing system 1001 (as shown in FIG. 10A), an autopilot 1201, a GPS 1203, a propulsion system 1205, sensors 1207, transceiver(s) 1211, and a power supply 1209.

The autopilot 1201 is responsible for autonomous control and operation of the autonomous mobile node and measures various states of the autonomous mobile node. The autopilot 1201 may include a barometer and an inertial measurement unit (IMU) with one or more accelerometers, one or more gyroscopes and/or one or more magnetometers providing accelerations and/or angular rates in the autonomous mobile node.

The GPS 1203 may include a GPS receiver to determine location information such as GPS coordinates of the autonomous mobile node. The sensors 1207 may include various types of on-board sensors, such as the radio frequency based geo-location sensor 1102, the chemical/biological sensor 1104, the camera sensor 1103, the network quality sensor (not shown), as shown in FIG. 11. Using the on-board sensors, various types of data (or measurement data) may be obtained and processed for different purposes. In one implementation, processing inside each sensor may transform the measurement data into a vector consisting of a direction and magnitude components as part of the specific API implementation (e.g., in accordance with methodology described herein in reference to FIG. 4), which is then provided to the processing system 1001 via the API. In another aspect, the measurement data from various sensors can be used to autonomously monitor and/or control the operation of the autonomous mobile node. Alternatively, the measurement data may be used to identify and/or track a target node (or the second node) on the ground as described in reference to FIGS. 8 and 9 above.

The propulsion system 1205 may include an engine or other propulsion systems for the autonomous mobile node. One implementation of the propulsion system 1205 may further include a plurality of rotors, as shown in FIG. 12C below.

The sensors 1207 may include one or more sensors such as camera sensors 1103, geo-location sensors 1007, chemical or biological sensors 1104, etc., as described herein.

The transceiver(s) 1211 may include one or more transceivers and/or transceiver interface 1006 for communicating with one or more nodes on the ground or communicating with other autonomous mobile nodes deployed in the air. As noted earlier, the transceiver interface 1006 may be configured to support various short and long range wireless communications protocols including UMB, Wi-Fi, WiMax, IEEE 802.20, UWB, Bluetooth, and/or other suitable protocols. The power supply 1209 may include various types of batteries or power supplies for providing power to electronics and various components on board the autonomous mobile node 1200.

Figure 12B:
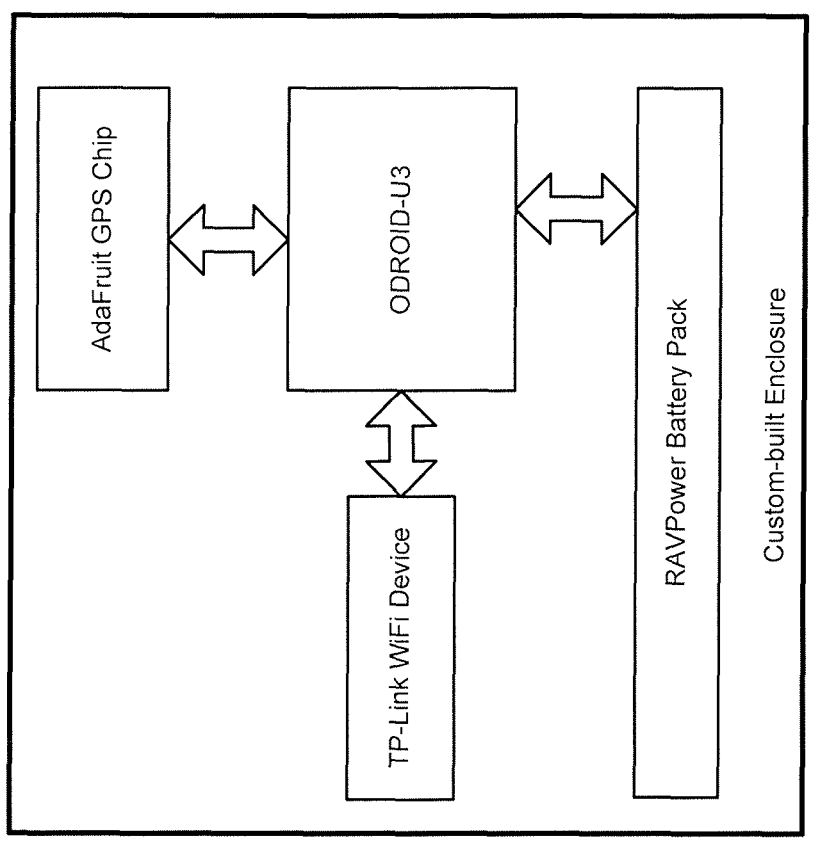
Figure 12C:
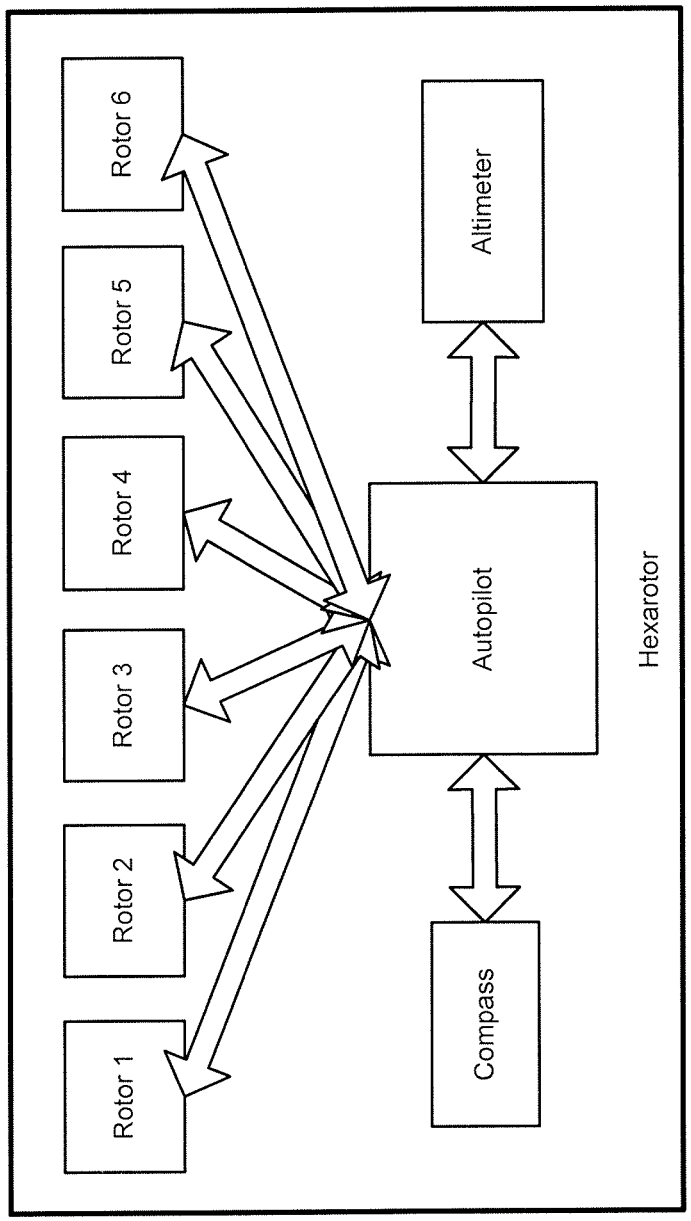

FIGS. 12B and 12C illustrate example configurations of the hardware component of an autonomous mobile node. FIG. 12B illustrates a simple block diagram of a custom-built enclosure for the autonomous mobile node including a processing system (e.g., ODROID-U3), a GPS (e.g., Ada-Fruit GPS Chip), a transceiver (e.g., TP-Link Wi-Fi Device), and a power supply (e.g., RAVPower Battery Pack). In the example, the processing system may include a HardKernel ODROID-U2, the GPS may include an Adafruit Ultimate GPS Breakout v3, the transceiver may include a TP-LINK TL-WN722N Wireless N150 USB adapter, and the power supply may include a RAVPower Element 10400 mAh external USB battery.

FIG. 12C shows one implementation of a hardware system (e.g., Hexarotor) including the propulsion system, sensors and autopilot. In particular, the propulsion system may include six (6) rotors, the sensors may include an electronic compass and altimeter, while the autopilot may include a dedicated Raspberry Pi with proprietary software.

Further, as noted above, the autonomous mobile node may include as an optional component one or more cameras 1103, such as a video camera or a snapshot camera for capturing video data or image data. The captured video data or image data may be stored and/or transmitted to other node including an adjacent autonomous mobile node, via the transceiver 1211 of the autonomous mobile node. Further, the captured video data or image data may be transmitted to the origin node through one or more autonomous mobile nodes forming a tentacle (e.g., via relaying of the captured video data or image data from one autonomous mobile node to another autonomous mobile node in the tentacle). In one implementation, as the autonomous mobile node navigates, the camera may wirelessly stream video in real time via other autonomous mobile nodes in the tentacle to another autonomous mobile node or an origin node for further processing of the captured video.

Figure 13:
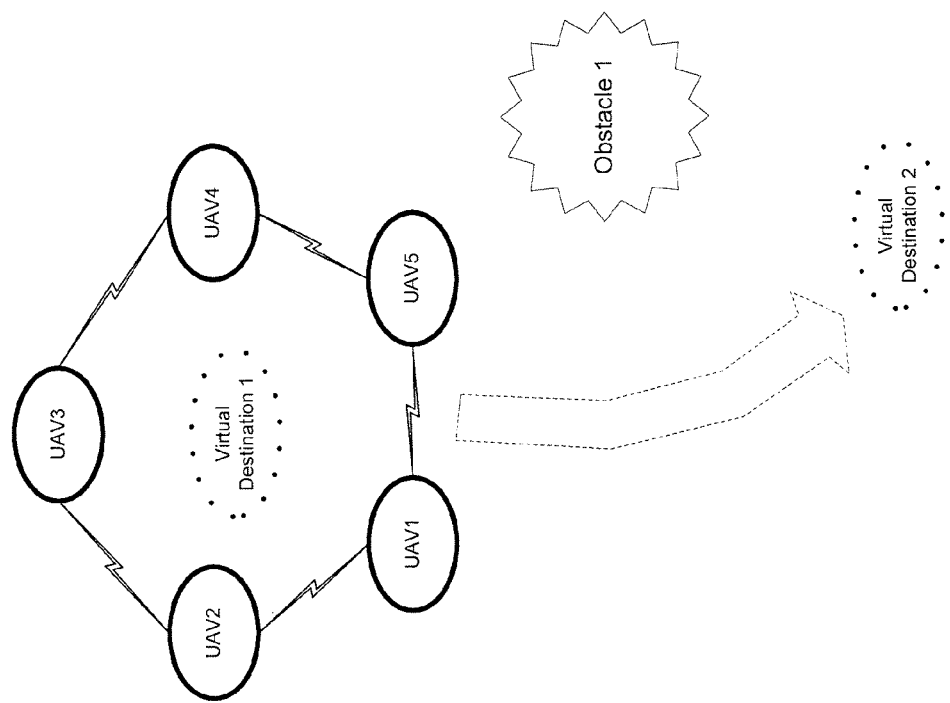
FIGS. 13 and 14 conceptually illustrate collaborative navigation in accordance with certain aspects of the present disclosure.
Figure 14:
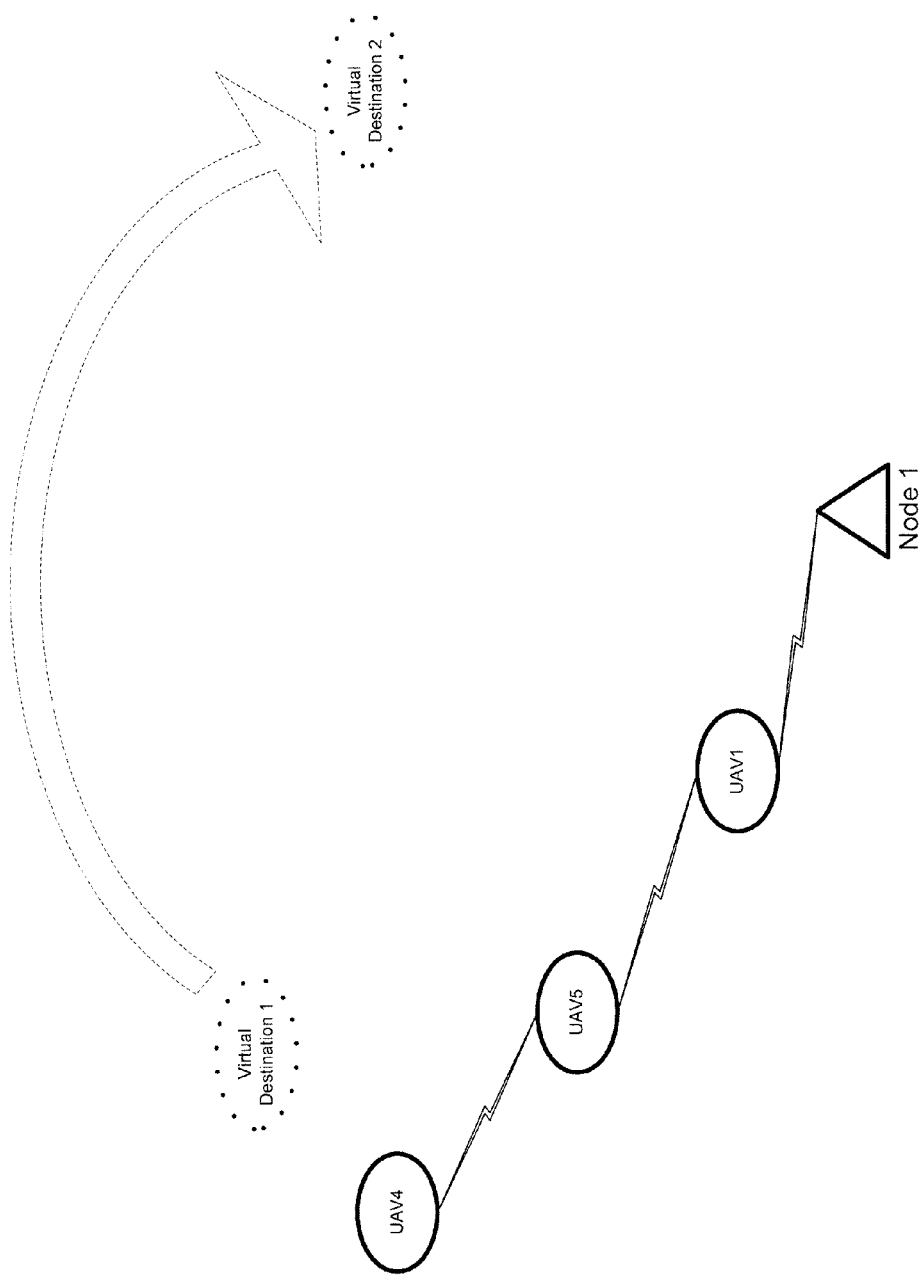

FIGS. 13 and 14 illustrate examples of collaborative navigation in accordance with certain aspects of the present disclosure. The example collaborative navigation maybe achieved by altering a profile of fields and assigning virtual destination or origin locations for the purpose of changing the overall shape and/or response of the communication network deployed. For example, in FIG. 13, the communication network may not be tethered to an origin node. Instead, all autonomous mobile nodes deployed in the air are attracted to a virtual location. The autonomous mobile nodes surround the virtual location, and moving the virtual location may result in forming an efficient mobile escort or defense perimeter. Also, additional fields from sensed obstacles (e.g., Obstacle 1) could be added directly into the field strength calculation to ensure the safety of autonomous mobile nodes (i.e., obstacle avoidance) as they move in the environment under communication constraints. Similarly, as shown in FIG. 14, the communication network may be a tentacle sweeping an area by moving a virtual destination defined along an arc at its maximum range.

As such, the present disclosure described herein provides many advantages and benefits. Among many advantages and benefits described herein, the present disclosure enables multiple autonomous mobile nodes to autonomously control themselves based on various onboard sensor data measurements and/or network performance. Further, the present disclosure may enable autonomously coordinating the motion of autonomous mobile nodes deployed in the air in a distributed manner, preventing a formation of suboptimal network, dealing with various types of autonomous mobile node failures, repairing and reinforcing critical locations of the communication network using the autonomous mobile nodes deployed in the air. Further, as described above, the present disclosure may enable autonomously detecting a signal of interest transmitted by a node, determining location of the node based on information received from one or more autonomous mobile nodes, and/or dynamically tracking movement of the node. Further, the present disclosure may enable autonomously detecting presence of a contaminant material and determining location of a contamination area based on information received from one or more autonomous mobile nodes.

In another aspect of the present disclosure, various functionalities relating to the present technology disclosed herein may be implemented using software, hardware, and any combination of software and hardware. Examples of algorithm pseudocode may include pseudocode relating to functions such as "main," "communicate," and "move," as follows.

```
[Pseudocode: Main]
Main
    Set the coordinates of the origin and destination from file
    Start communications thread calling Communicate every 0.2
    seconds
    Start motion thread calling Move every 0.5 seconds
End Main
```

```
[Pseudocode: Communicate]
Communicate
    Do
        Get a broadcasted message containing values from an
        adjacent node
        If the adjacent count > local count
            If the adjacent node is the origin or destination
                Set the stored origin and destination coordinates
            End If
            If the adjacent tentacle state is complete
                If other destination nodes exist
                    Set coordinates to the next destination
                End If
            Else if the adjacent tentacle state is damaged
                If the local role is reinforce
                    Set the local role to free
                Else if the local role is tip or backbone
                    Hold position
                End If
            End If
            Set the local tentacle state to adjacent tentacle state
            If the local role is tip and adjacent role is tip or
            backbone
                Set the local role to backbone
            End If
        End If
        Set tentacle proximity to 0
        For each adjacent node
            If adjacent role is origin or destination or backbone or
            reinforce
                Set tentacle proximity to tentacle proximity + 1
            End If
        End For
        If the tentacle proximity > 1 and the anchor is unknown
            If the local role is free and the adjacent role is
            backbone
                Set the local role to reinforce
                Set the anchor to the adjacent node
            Else if the adjacent role is reinforce and the local role
            is backbone
                Set the anchor to the adjacent node
            End If
        End If
        If the tentacle state is complete and the local role is tip
        or the adjacent role is tip
            Set the tentacle state to damaged
        End If
        Broadcast a message containing local values to all adjacent
        nodes
    While true
End Communicate
```

```
[Pseudocode: Move]
Move
    Do
        Set x-force to the difference between the x-coordinate and
        destination's x- coordinate
        Set y-force to the difference between the y-coordinate and
        destination's y- coordinate
        Set next attractor to 0
        Set next position to 0
        For each adjacent node
            If adjacent tentacle position > next position
                Set next attractor to adjacent node
                Set next position to adjacent tentacle position
            End If
        End For
        For each adjacent node
            If adjacent signal > maximum signal
                Set factor to signal – maximum signal normalized
            Else if adjacent signal < minimum signal
                Set factor to signal – minimum signal normalized
            Else
                Set factor to 0
            End If
            If adjacent role is destination and factor > 0
                Set factor to 0
            Else if adjacent role is origin or tip or backbone
            or destination
                Continue
            Else if role is tip or backbone
                Set factor to 0
            Else if role is extra
                Set factor to 0
            Else if factor < 0
                Set factor to 0
            End If
            Set additional-x-force to factor * normalized distance
            in x-axis to adjacent node
            Set additional-y-force to factor * normalized distance
            in y-axis to adjacent node
            If adjacent role is destination
                Set x-force to x-force + additional-x-force
                Set y-force to y-force + additional-y-force
                If local role is free and tentacle state is complete
                    Set local role to extra
                End If
                If local role is extra
                    If other destination nodes exist
                        Set coordinates to the next destination
                    Else
                        Change the destination coordinates to
                        the origin
                    End If
                End If
            Else if adjacent role is origin
                If next attractor is 0
                    Set x-force to x-force + additional-x-force
                    Set y-force to y-force + additional-y-force
                End If
                If local role is orphan
                    Set local role to free
                End If
                If local role is free and tentacle state is complete
                    Set local role to extra
                End If
            Else if adjacent role is tip and local role is not
            backbone
                Set x-force to x-force + additional-x-force
                Set y-force to y-force + additional-y-force
                If local role is orphan
                    Set local role to free
                End If
            Else if adjacent role is backbone
                If local role is backbone
                    Set x-force to x-force + additional-x-force
                    Set y-force to y-force + additional-y-force
                Else if adjacent node is next attractor
                    Set x-force to x-force + additional-x-force
                    Set y-force to y-force + additional-y-force
                If local role is orphan
                    Set local role to free
                End If
            Else if adjacent role is extra
                Set x-force to x-force + additional-x-force
                Set y-force to y-force + additional-y-force
            Else if adjacent role is free and local role is free
                Set x-force to x-force + additional-x-force
                Set y-force to y-force + additional-y-force
            End If
```

-continued

```
        End For
        If x-force < threshold and y-force < threshold
            Set equilibrium to true
        Else
            Set equilibrium to false
        End If
        If there are no adjacent nodes
            Set local role to orphan
        Else if local role is tip and equilibrium is true
            Set x-force to 0
            Set y-force to 0
        Else if local role is backbone and adjacent nodes < 2
            Set local role to tip
            Change local tentacle state to damaged
        End If
        If local role is orphan
            Set x-force to the difference between the x-coordinate
and origin's x- coordinate
            Set y-force to the difference between the y-coordinate
and origin's y- coordinate
        Else if local role is free and equilibrium is true or adjacent
        role is destination
            Set local role to tip
            Set tentacle position to tentacle position + 1
            If adjacent role is destination
                Set tentacle state to complete
        End If
        Send desired UAV coordinates with x-force, y-force
    While true
End Move
```

As noted above, various functions or operations relating to the present technology disclosed herein (e.g., various flow charts, process diagrams, algorithms, etc.) may be implemented in one or more processors or computer systems running in autonomous mobile nodes. As well known in the art, a general purpose computer typically comprises a central processor or other processing device, an internal communication bus, various types of memory or storage media (RAM, ROM, EEPROM, cache memory, disk drives, etc.) for code and data storage, one or more network interface cards or ports for communication purposes. The software functionalities involve programming, including instructions or executable code as well as associated stored data, e.g., files used for implementing various operations including operations or functionalities described herein in accordance with the present disclosure. The software code may relate to a client or a server or network element functions and may be executable by the general purpose computer. In operation, as noted above, the code is stored in a non-transitory machine readable storage medium within a general purpose computer platform. However, at other times, the software may be stored at other locations and/or transported for loading into an appropriate general purpose computer system for execution. Software code for applications or other programming relating to operations and/or functionalities disclosed herein may also be stored in a server and transmitted through a network for storage in memories of a client.

In another variation, the method and system in accordance with certain aspects of the present disclosure may operate in a stand-alone environment, such as on a single autonomous mobile node or a ground node. In another variation, the method and system in accordance with certain aspects of the present disclosure may operate in a client-server environment or in a distributed computing environment over multiple computing platforms including processing systems embodied in multiple autonomous mobile nodes. It is to be understood that the specific order or hierarchy of steps in the methods disclosed herein is an illustration of example processes and may be rearranged. Thus, various steps of the accompanying method claims are presented in a sample order and thus are not meant to be limited to the specific order or hierarchy presented unless stated otherwise.

The illustrations and examples provided herein are for explanatory purposes and are not intended to limit the scope of the appended claims. The present disclosure is to be considered an example embodiment of one or more inventive concepts and is not intended to limit the spirit and scope of the invention and/or claims of the example illustrated. Further, various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. All structural and functional equivalents to the elements of the various aspects described throughout this disclosure that are known or later come to be known to those of ordinary skill in the art are expressly incorporated herein by reference and are intended to be encompassed by the claims. Nothing disclosed herein is intended to be dedicated to the public regardless of whether such disclosure is explicitly recited in the claims. It is also noted that no claim element is to be construed under 35 U.S.C. §112, 6th paragraph, or 35 U.S.C. §112(f), whichever is appropriate, unless the claim element is expressly recited using the phrase "means for" or "step for" (as in the case of a method claim).

Further, while there has been illustrated and/or described what are presently considered to be example features, it will be apparent to those skilled in the art that various other modifications may be made and/or equivalents may be substituted, without departing from claimed subject matter. Additionally, many modifications may be made to adapt a particular situation to the teachings of claimed subject matter without departing from the concept(s) described herein. Thus, the claimed subject matter is intended to be not limited to the particular examples disclosed herein, but that such claimed subject matter may also include all aspects falling within appended claims and/or equivalents thereof.

Various embodiments have been described herein, and the descriptions of the various embodiments are intended to be illustrative and are not intended to be limiting. Various modifications and applications may be made by those skilled in the relevant art, without departing from the scope of the appended claims.

What is claimed is:

1. A method for wireless communications, comprising:
deploying in the air a plurality of autonomous airborne mobile nodes to establish a wireless communication network between a first node and a second node, the wireless communication network comprising a plurality of wireless communication links each established among the plurality of autonomous airborne mobile nodes;
autonomously establishing a first wireless communication link between the first node and a first autonomous airborne mobile node included in the plurality of autonomous airborne mobile nodes, based at least in part on role information of the plurality of autonomous airborne mobile nodes, the role information comprising a backbone node, a tip node, or a free node, wherein the tip node is positioned at one end of the first wireless communication link away from the first node and the backbone node is positioned between the first node and the tip node, and wherein when the first wireless communication link is established between the first node and the first autonomous airborne mobile node, the role information of the first autonomous airborne node changes from the free node to the tip node;

autonomously coordinating or controlling the motion of the plurality of autonomous airborne mobile nodes, wherein the coordinating or controlling is performed in a distributed manner among the plurality of autonomous airborne mobile nodes, based on fields determined from data received in real-time from one or more onboard sensors of the plurality of autonomous airborne mobile nodes, each field comprising a field strength component and a velocity component and being configured to result in attraction or repulsion force of the plurality of autonomous airborne mobile nodes based on the received real-time data such that the plurality of autonomous airborne mobile nodes move to establish the plurality of wireless communication links, to form the wireless communication network with the first node via the first autonomous airborne mobile node; and autonomously extending the wireless communication network to include a wireless communication link with the second node, wherein when the wireless communication network is established with the second node, the role information of the plurality of autonomous airborne mobile nodes included in the wireless communication network with the first node changes to the backbone node.

2. The method of claim 1, further comprising:
determining whether a portion of the wireless communication network has been damaged; and
autonomously repairing the damaged wireless communication network, in the distributed manner among the plurality of autonomous airborne mobile nodes, upon determining that the portion of the wireless communication network has been damaged.

3. The method of claim 2, wherein:
determining whether a portion of the wireless communication network is damaged comprises determining whether one of the one or more autonomous airborne mobile nodes is out of communications; and
autonomously repairing the wireless communication network in the distributed manner comprises:
replacing the autonomous airborne mobile node that is determined to be out of communications, with another autonomous mobile node which is a free or extra node or any one of the one or more autonomous airborne mobile nodes forming the wireless communication network, which is configured to change the role information and position information to replace the autonomous airborne mobile node that is determined to be out of communications.

4. The method of claim 1, wherein deploying in the air a plurality of autonomous airborne mobile nodes comprises launching the plurality of autonomous airborne mobile nodes towards a virtual location of the first node, the plurality of autonomous airborne mobile nodes including information on the virtual location of the first node and one or more destinations.

5. The method of claim 1, wherein the data further comprises information on signal strength or quality of signals received in real-time from the plurality of autonomous airborne mobile nodes.

6. The method of claim 1, further comprising:
navigating a first autonomous airborne mobile node of the plurality of autonomous airborne mobile nodes;
determining whether there is a tentacle associated with the first node, wherein the tentacle comprises one or more wireless communication links established by the plurality of autonomous airborne mobile nodes;
when it is determined that there is the tentacle associated with the first node, navigating the first autonomous airborne mobile node along the tentacle towards a location based at least in part on the data received in real-time from the plurality of autonomous airborne mobile nodes, the data being measurement data received from one or more sensors onboard the first autonomous airborne mobile node; or
when it is determined that there is no tentacle associated with the first node, navigating the first autonomous airborne mobile node towards a location at an edge of a communication range of the first node, based at least in part on the received data from the first node, establishing the tentacle with the first node and change the role information of the first autonomous airborne mobile node to a tip node of the tentacle.

7. The method of claim 6, further comprising:
determining whether a wireless communication link with the second node has been established; and
upon determining that the wireless communication link with the second node has been established, extending the tentacle with the first node to include the wireless communication link with the second node, and thereby establishing the wireless communication network between the first node and the second node via the plurality of autonomous airborne mobile nodes deployed therebetween.

8. The method of claim 1, wherein the plurality of autonomous airborne mobile nodes comprise unmanned aerial vehicles (UAVs).

9. The method of claim 2, wherein determining whether the portion of the wireless communication network has been damaged comprises:
sending a probe signal to a first adjacent autonomous airborne mobile node in a tentacle with the first node; and
responsive to the probe signal, receiving a response signal from the first adjacent autonomous mobile node within a period of time set by a timer; or
responsive to the probe signal and upon expiration of the timer, determining that the first adjacent autonomous airborne mobile node is out of communications, and determining that the wireless communication network via the tentacle has been damaged.

10. The method of claim 9, further comprising:
after determining that the wireless communication network has been damaged, communicating with a second adjacent autonomous airborne mobile node to replace the first adjacent autonomous airborne mobile node with another autonomous airborne mobile node having the role information as a free or extra node;
communicating with the another autonomous airborne mobile node;
navigate the another autonomous airborne mobile node such that the another autonomous airborne mobile node becomes part of the tentacle with the first node; and re-establishing the wireless communication network with the first node via at least the another autonomous airborne mobile node and change the role information of the another autonomous airborne mobile node to a backbone or a tip node of the tentacle.

11. An autonomous mobile apparatus, comprising:
a memory; and
at least one processor coupled to the memory, wherein the at least one processor is configured to:
coordinate and/or control motion of the autonomous mobile apparatus, in a distributed manner among a plurality of autonomous mobile apparatuses deployed in the air, to form a wireless communication network with a first node on the ground;
receive measurement data in real-time from one or more sensors onboard the autonomous mobile apparatus about the plurality of autonomous mobile apparatuses;
convert the measurement data into field information, the field information comprising a plurality of fields each being configured to comprise a field strength component and a velocity component and configured to result in an attractive force or a repulsive force of the plurality of autonomous mobile apparatuses;
receive role information of the plurality of autonomous mobile apparatuses, the role information comprising a backbone node, a tip node, or a free node, wherein the tip node is positioned at one end of the first wireless communication link away from the first node and the backbone node is positioned between the first node on the ground and the tip node; and
based on the field information and the role information, coordinate or control the motion of the autonomous mobile apparatus in the distributed manner among the plurality of autonomous mobile apparatuses such that the autonomous mobile apparatus moves to establish the wireless communication network with the first node on the ground, via the plurality of autonomous mobile apparatuses.

12. The autonomous mobile apparatus of claim 11, wherein the autonomous mobile apparatus comprises an unmanned aerial vehicle (UAV).

13. The autonomous mobile apparatus of claim 11, wherein the at least one processor is further configured to establish wireless communications with either the first node or another autonomous airborne mobile apparatus.

14. The autonomous mobile apparatus of claim 11, wherein the one or more sensors include at least one of: a radio geo-location sensor, an image sensor, a chemical sensor, or a biological sensor.

15. The autonomous mobile apparatus of claim 11, wherein the at least one processor is further configured to:
determine whether there is a tentacle established with the first node, the tentacle comprising one or more wireless communication links established by the plurality of autonomous mobile apparatuses;
when it is determined that there is the tentacle established with the first node, navigate the autonomous mobile apparatus along the tentacle to a location based on the field information and the role information; or
when it is determined that there is no tentacle established with the first node, establish a wireless communication link with the first node, thereby forming the tentacle with the first node and change the role information of the autonomous mobile apparatus to a tip node of the wireless communication link.

16. The autonomous mobile apparatus of claim 15, wherein the at least one processor is further configured to:
determine whether a second node on the ground is within a wireless communications range of the autonomous mobile apparatus; and
upon determining that the second node on the ground is within the wireless communications range of the autonomous mobile apparatus, establish a wireless communications link with the second node on the ground, thereby extending the tentacle to include a wireless communication network via the one or more autonomous airborne mobile apparatuses between the first node and the second node on the ground.

17. The autonomous mobile apparatus of claim 15, wherein the at least one processor is further configured to:
process the measurement data in real-time from the one or more sensors, the one or more sensors being configured to include at least one image sensor;
detect presence of a second node on the ground based on the measurement data; and
transform the measurement data into the field information.

18. The autonomous mobile apparatus of claim 17, wherein the at least one processor is further configured to, upon detecting the presence of the second node on the ground, dynamically track movement of the second node on the ground by moving the plurality of autonomous mobile apparatuses as a group as the second node moves on the ground.

19. The autonomous mobile apparatus of claim 18, wherein the at least one processor is further configured to:
represent the second node on the ground as a virtual node in determining the attractive and/or repulsive force; and
navigate the autonomous mobile apparatus based on the field information.

20. The autonomous mobile apparatus of claim 18, wherein the at least one processor is further configured to:
capture a video of the movement of the second node on the ground; and
transmit the captured video to the first node via the tentacle.

21. The autonomous mobile apparatus of claim 15, wherein the at least one processor is further configured to:
process the measurement data received in real-time from the one or more sensors, the one or more sensors being configured to include at least one radio frequency (RF) geo-location sensor and the measurement data comprising detection probability of a RF signal emitted by a second node on the ground;
based on the measurement data, determine whether the second node is present on the ground; and
upon determining that the second node is present on the ground, communicate to attract one or more autonomous airborne mobile apparatuses to a location close to the second node on the ground.

22. The autonomous mobile apparatus of claim 21, wherein the at least one processor is further configured to transmit to the first node, via the tentacle, a determined location of the second node on the ground.

23. The autonomous mobile apparatus of claim 15, wherein the at least one processor is further configured to:
process the measurement data received in real-time from the one or more sensors, the one or more sensors being configured to include at least one biological or chemical sensor and the measurement data comprising a detected level of a target contaminant material;
determine whether the detected level of the target contaminant material is greater than or equal to a predetermined value;

upon determining that the detected level of the target contaminant material is greater than or equal to the predetermined value, communicate to the first node, via the tentacle, information on the detected level of the target contaminant material.

24. The autonomous mobile apparatus of claim 23, wherein the at least one processor is further configured to determine location of the detected target contaminant material, based on information received from the plurality of autonomous mobile apparatuses which detected the target contaminant material.

25. The method of claim 1, wherein the roles of the plurality of autonomous airborne mobile nodes further include an orphan node, or an extra node in the wireless communication network.

26. The method of claim 1, wherein autonomously navigating the plurality of autonomous airborne mobile nodes based on fields determined from data received in real-time from one or more onboard sensors of the plurality of autonomous airborne mobile nodes comprises:
- determining a field based on the data collected from the one or more onboard sensors;
- receiving field information from the plurality of autonomous airborne mobile nodes;
- summing the determined field based on the data and the received field information from the plurality of autonomous airborne mobile nodes into a combined field; and
- navigating the plurality of autonomous airborne mobile nodes in accordance with the combined field.

27. The method of claim 1, wherein the plurality of autonomous airborne mobile nodes each are configured to:
- include same code;
- differentiate the role information at a run-time; and
- communicate with adjacent neighboring airborne mobile nodes.

28. The method of claim 1, wherein each of the plurality of autonomous airborne mobile nodes is configured to broadcast a current state to each neighbor at scheduled times.

29. The method of claim 28, wherein an autonomous airborne mobile node does not hear from at least two adjacent autonomous airborne mobile nodes over a predetermined period of time, the autonomous airborne mobile node becomes a tip node.

30. The method of claim 1, wherein determining whether a portion of the wireless communication network has been damaged comprises determining whether two or more tip nodes exist.

31. The method of claim 1, further comprising autonomously reinforcing critical locations of the wireless communication network using one or more extra nodes.

32. The method of claim 1, wherein one or more operators at a central location are enabled to monitor the one or more autonomous airborne mobile nodes through a unified user interface, and wherein control data relating to the plurality of autonomous airborne mobile nodes are relayed back to the central location via the wireless communication network so as for the one or more operators to interact and control the plurality of autonomous airborne mobile nodes, via the unified user interface.

33. The method of claim 1, wherein the fields are determined based on normalized sensor data which is converted into the attraction or repulsion force of the plurality of autonomous airborne mobile nodes.

* * * * *